(12) United States Patent
Choi

(10) Patent No.: US 10,390,327 B2
(45) Date of Patent: Aug. 20, 2019

(54) METHODS AND APPARATUS FOR OPTIMIZING PAGING MECHANISMS AND PUBLICATION OF DYNAMIC PAGING MECHANISMS

(71) Applicant: APPLE INC., Cupertino, CA (US)

(72) Inventor: Hyung-Nam Choi, Hamburg (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/830,826

(22) Filed: Dec. 4, 2017

(65) Prior Publication Data

US 2018/0103451 A1  Apr. 12, 2018

Related U.S. Application Data

(63) Continuation of application No. 12/409,398, filed on Mar. 23, 2009, now Pat. No. 9,839,001.

(51) Int. Cl.
*H04W 68/02* (2009.01)

(52) U.S. Cl.
CPC ............ *H04W 68/02* (2013.01); *Y02D 70/00* (2018.01); *Y02D 70/1222* (2018.01); *Y02D 70/1242* (2018.01); *Y02D 70/1262* (2018.01); *Y02D 70/1264* (2018.01); *Y02D 70/144* (2018.01); *Y02D 70/146* (2018.01); *Y02D 70/164* (2018.01); *Y02D 70/24* (2018.01)

(58) Field of Classification Search
CPC ..... H04W 48/00; H04W 48/18; H04W 68/00; H04W 72/00; H04W 72/04; H04W 72/12; H04W 84/027; H04W 88/06; Y02B 60/14; Y02B 60/142; Y02B 60/144; Y02B 60/16; Y02B 60/167; Y02B 60/40; Y02B 60/50; Y02D 70/00; Y02D 70/146; Y02D 70/1242; Y02D 70/1262; Y02D 70/1222; Y02D 70/144; Y02D 70/1264; Y02D 70/164; Y02D 70/24
USPC ............. 455/450–454, 434, 458, 515, 426.1; 370/254
See application file for complete search history.

(56) References Cited

U.S. PATENT DOCUMENTS

| | | | |
|---|---|---|---|
| 2009/0116427 A1* | 5/2009 | Marks | H04L 5/0007 370/328 |
| 2009/0143072 A1* | 6/2009 | Montojo | H04W 68/02 455/450 |
| 2009/0257366 A1* | 10/2009 | Power | H04L 5/0037 370/280 |

(Continued)

*Primary Examiner* — Michael Y Mapa
(74) *Attorney, Agent, or Firm* — Fay Kaplun & Marcin, LLP

(57) ABSTRACT

Methods and apparatus enabling a wireless network to dynamically change or implement paging mode operation, such as optimization based on one or more network parameters. In one embodiment, the wireless network is a cellular network (e.g., 3G UMTS or LTE), and both base stations and cellular user devices dynamically configure the paging mode operation based on various desired operational attributes relating to the network parameters. Such flexible paging mechanisms may be published to the network users via several methods, and users with appropriately enabled user devices may improve their power and applications performance. Base stations may also advantageously reclaim freed-up cellular resources to support other services. Legacy subscribers are also not affected.

20 Claims, 15 Drawing Sheets

(56) References Cited

U.S. PATENT DOCUMENTS

2010/0130218 A1* 5/2010 Zhang .................. H04W 48/12
455/450
2010/0227569 A1* 9/2010 Bala ..................... H04L 5/0007
455/73

* cited by examiner

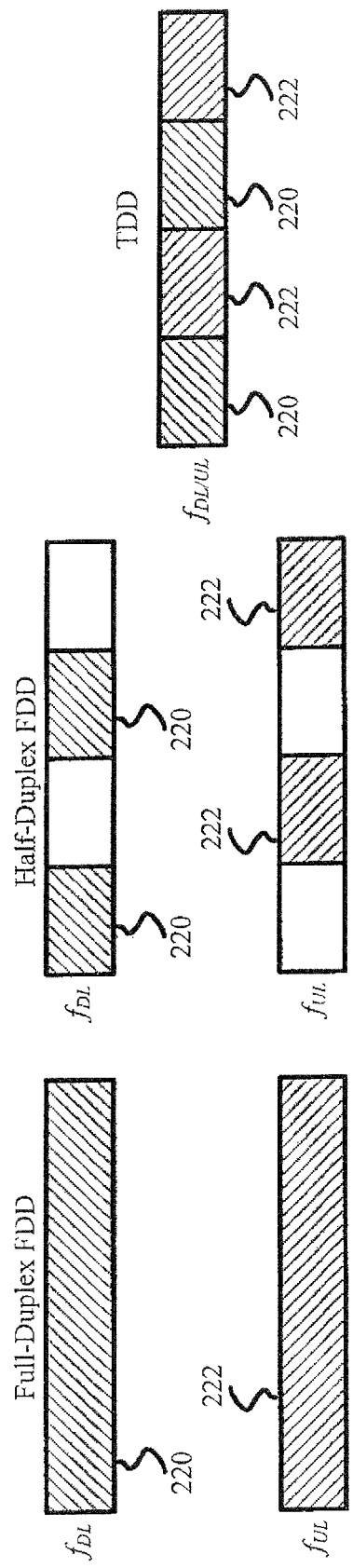

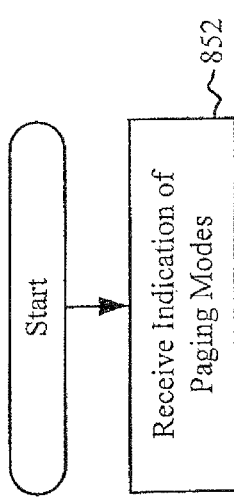
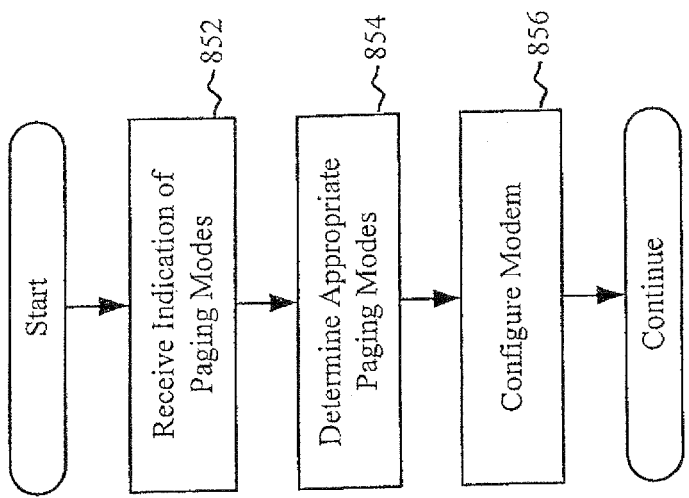
FIG. 8
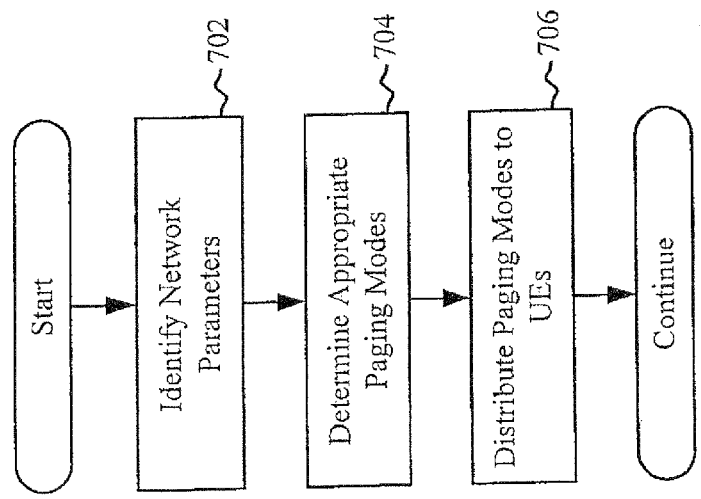
FIG. 7

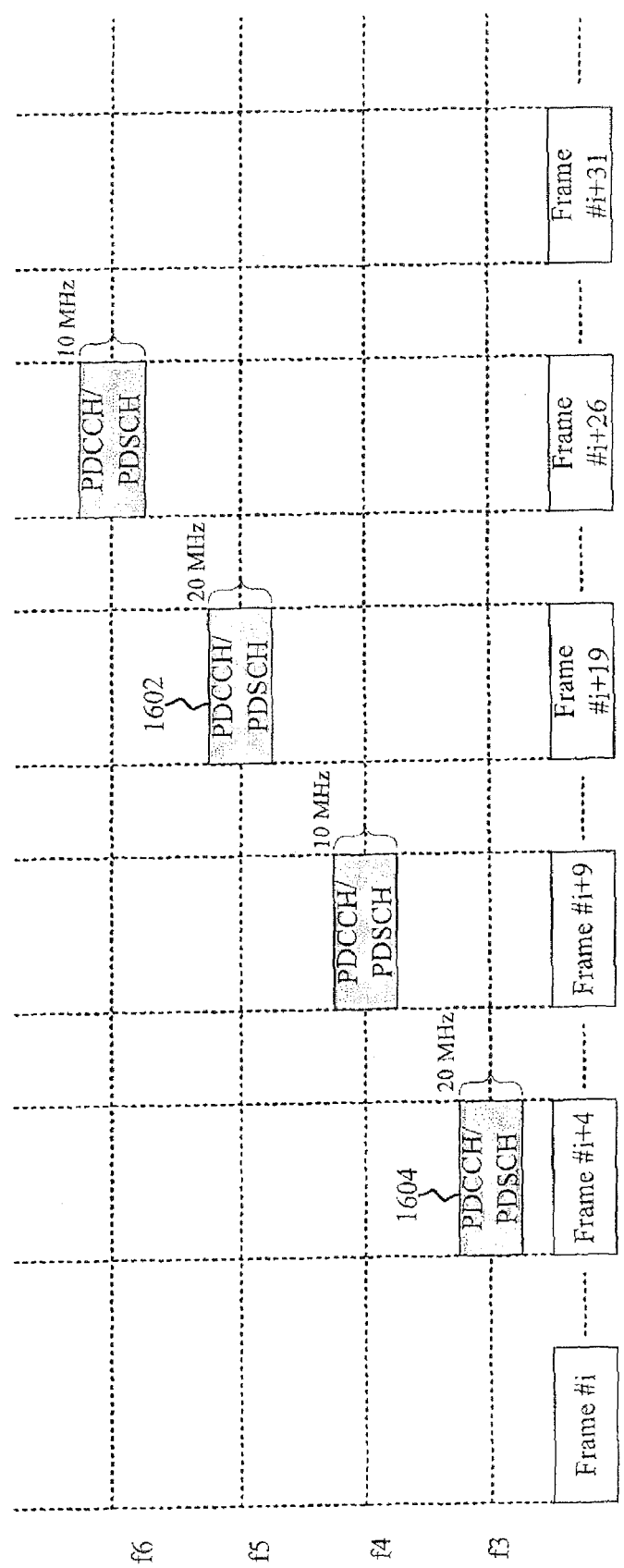

METHODS AND APPARATUS FOR OPTIMIZING PAGING MECHANISMS AND PUBLICATION OF DYNAMIC PAGING MECHANISMS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks. More particularly, in one exemplary aspect, the present invention is directed to methods and apparatus for flexible paging transmission modes in a wireless communication and data network.

2. Description of Related Technology

Universal Mobile Telecommunications System (UMTS) is an exemplary implementation of a "third-generation" or "3G" cellular telephone technology. The UMTS standard is specified by a collaborative body referred to as the $3^{rd}$ Generation Partnership Project (3GPP). The 3GPP has adopted UMTS as a 3G cellular radio system targeted for inter alia European markets, in response to requirements set forth by the International Telecommunications Union (ITU). The ITU standardizes and regulates international radio and telecommunications. Enhancements to UMTS will support future evolution to fourth generation (4G) technology.

A current topic of interest is the further development of UMTS towards a mobile radio communication system optimized for packet data transmission through improved system capacity and spectral efficiency. In the context of 3GPP, the activities in this regard are summarized under the general term "LTE" (for Long Term Evolution). The aim is, among others, to increase the maximum net transmission rate significantly in the future, namely to speeds on the order of 300 Mbps in the downlink transmission direction and 75 Mbps in the uplink transmission direction.

Further advancements of 3GPP are being investigated within LTE towards an IMT-Advanced radio interface technology, referred to as "LTE-Advanced" or "LTE-A". Details regarding scope and objectives of the LTE-Advanced study are described at, inter alia; RP-080137 entitled "*Further advancements for E-UTRA (LTE-Advanced)*" to NTT DoCoMo et al., the contents of which are incorporated herein by reference in its entirety. The IMT-Advanced activities have been commenced and are guided by ITU-R (International Telecommunications Union-Radio Communication Sector). Key features to be supported by candidate IMT-Advanced systems have been set by ITU-R and include amongst others: (1) high quality mobile services; (2) worldwide roaming capability; and (3) peak data rates of one hundred (100) Mbps for high mobility environments, and of one (1) Gbps for low mobility environments.

The current discussions in 3GPP related to LTE-A are focused on the technologies to further evolve LTE in terms of spectral efficiency, cell edge throughput, coverage and latency based on the requirements in 3GPP TS 36.913: "*Requirements for further advancements for E-UTRA (LTE-Advanced)*", the contents of which are incorporated herein by reference in its entirety. Candidate technologies include (1) multi-hop Relay; (2) downlink network Multiple Input Multiple Output (MIMO) antenna technologies; (3) support for bandwidths greater than twenty MHz by spectrum aggregation; (4) flexible spectrum usage/spectrum sharing; and (5) intercell interference management. Backward compatibility with legacy LTE networks is also an important requirement for future LTE-A networks, i.e. an LTE-A network also supports LTE UEs, and an LTE-A UE can operate in an LTE network.

Prior Art Paging Mechanisms—

Paging mechanisms are used in many prior art cellular mobile radio communication systems such as UMTS. Paging mechanisms allow a UE to minimize power consumption by operating in a reduced or "idle" state while unused. Once a UE receives a paging notification, it "wakes up" to respond. Various approaches to paging management within wireless systems are evidenced in the prior art. For example, some paging systems inefficiently transmit paging messages over the entire cell bandwidth in frequency-domain systems. Alternately, time-domain systems may reserve entire time slots for paging processes.

Accordingly, a suitable paging mechanism is needed which specifically addresses networks having fragmented multi-band operational capabilities, and flexible resourcing. Such an improved solution should operate seamlessly and without adversely impacting user experience on existing radio apparatus, and that of other wireless devices.

Moreover, in certain systems (e.g. LTE), the RF capabilities of UEs may differ from the overall capabilities of the servicing base station. In other systems, a population of legacy UEs may have different capabilities than newer UEs. In either case, a flexible paging mechanism is needed to take into account limited RF TX/RX (Transmission/Reception) capabilities of a population of UEs.

Improved apparatus and methods for paging mechanisms specifically addressing the complexities of the new LTE-Advanced architecture are needed. The LTE-Advanced system architecture combines fragmented multiband capabilities, OFDM access, and mixed populations of legacy and newer UEs. Existing mechanisms for paging within this architecture are less than optimal.

SUMMARY OF THE INVENTION

The present invention satisfies the aforementioned needs by providing improved apparatus and methods for paging in a wireless network. In one aspect of the invention, a method of providing paging channel access for a wireless network is disclosed. In one embodiment, the network is a cellular network, and the paging channel access is optimized for one or more network parameters. The method involves: allocating one or more resources for paging channel access based at least in part on the one or more network parameters; providing a schedule for paging channel access to a plurality of user devices, the schedule identifying the allocated one or more resources; and transmitting the schedule. This transmission enables at least one of the user devices to configure its modem to receive the allocated one or more resources.

In one variant, providing the schedule includes broadcasting the schedule via a common control channel.

In another variant, the schedule is particularly addressed to only a subset of the plurality of user devices.

In yet another variant, the act of allocating one or more resources includes limiting paging channel access to only one of: (i) a transmission time, (ii) a frequency band, or (iii) a spreading code.

In a further variant, allocating one or more resources includes limiting paging channel access to at least one of (i) a transmission time, (ii) a frequency band, or (iii) a spreading code.

In still another variant, the network parameters comprise at least one of: (i) total cell bandwidth, (ii) level of bandwidth fragmentation, and (iii) one or more characteristics of the plurality of user devices. The cellular network is an LTE-compliant cellular network, and providing the schedule includes broadcasting the schedule via a broadcast message.

In a second aspect of the invention, a method of receiving one or more paging channel configurations by a user of a wireless network is disclosed. In one embodiment, the wireless network is a cellular network, and the method includes: receiving the first message at a user device; extracting a paging schedule from the first message; configuring a modem interface of the user device to receive one or more paging channel notifications based at least in part on the schedule; and responsive to receiving a paging channel notification, determining if the received paging channel notification is for the user.

In one variant, the paging schedule is received over a dedicated control channel.

In another variant, the schedule is particularly addressed to only a subset of user devices in the network.

In yet another variant, the method is optimized for at least one of: (i) total cell bandwidth, (ii) level of bandwidth fragmentation, and (iii) one or more characteristics of the plurality of user devices.

In a further variant, configuring of the modem interface includes updating an internal schedule identifying one or more times and one or more frequency bands available for discontinuous reception (DRX).

In a third aspect of the invention, wireless base station apparatus is disclosed. In one embodiment, the apparatus includes: a digital processor, a wireless interface in data communication with the processor, and a storage device in data communication with the processor, the storage device comprising computer-executable instructions. When executed by the digital processor, the instructions: determine a mode for paging channel transmissions based at least in part on one or more wireless network parameters; transmit information relating to the mode via the wireless interface; and transmit the paging channel transmission via the wireless interface based on the mode.

In one variant, the wireless network is a cellular network, and the one or more wireless network parameters comprise at least one of: (i) total cellular cell bandwidth, (ii) level of bandwidth fragmentation, and (iii) one or more characteristics of a plurality of user devices associated with the network. Transmission of the information relating to the mode includes for example transmission of the information addressed to only a subset (e.g., just one) of the plurality of user devices via a cellular common control channel.

In another variant, the one or more wireless network parameters comprise at least Radio Resource Connection (RRC) state.

In a further variant, the apparatus is an LTE-compliant macrocell base station.

In yet another variant, the information relating to the mode includes: information regarding a carrier frequency on which the paging transmission is to be transmitted; timing data according to which a paging identifier and a paging message are to be transmitted; and information relating to a bandwidth size of one or more channels on which a user device of the network may receive the paging identifier and paging message. The information relating to the mode may include other information as well; e.g., Radio Resource Connection (RRC) state information.

In another variant, the one or more channels comprise a Physical Downlink Control Channel (PDCCH) and a Physical Downlink Shared Channel (PDSCH), and the paging identifier and paging message are to be transmitted on the PDCCH and the PDSCH, respectively.

In still another variant, the determination of a mode for paging channel transmissions based at least in part on one or more wireless network parameters includes selecting one of a plurality of different modes, the plurality of modes being substantially non-overlapping in time and frequency with respect to one another.

In a fourth aspect of the invention, wireless receiver apparatus is disclosed. In one embodiment, the apparatus includes: a digital processor; a wireless interface in data communication with the digital processor, and a storage device in data communication with the processor, the storage device comprising at least one computer program. When run on the processor, the program: receives a schedule for paging channel transmissions; configures the wireless interface to receive one or more paging channel notifications based at least in part on the received schedule; and responsive to receiving a paging channel notification, determines if the first paging channel notification is addressed to the receiver apparatus.

In one variant, the schedule is received via an interface different than the wireless interface; e.g., a transceiver within the apparatus adapted to receive wireless signals according to a protocol different than that associated with the wireless interface.

In another variant, the wireless receiver apparatus includes a substantially mobile cellular smartphone having a multi-touch screen user interface.

In a further variant, the configuration of the wireless interface includes updating an internal schedule identifying one or more times and one or more frequency bands available for discontinuous reception (DRX).

In a fifth aspect of the invention, computer readable apparatus having a storage medium is disclosed. In one embodiment, the medium includes a plurality of computer-executable instructions that, when executed by a digital processor: determine a schedule for paging channel transmissions based at least in part on one or more wireless network parameters; cause transmission of the schedule via a wireless interface associated with a host device on which the instructions are executed; and cause transmission of the paging channel via the wireless interface based on the schedule.

In a sixth aspect of the invention, a method of doing business with respect to a cellular network is disclosed. In one embodiment, the method includes: distributing a base station adapted for ad hoc deployment within the network to a user of the network; and causing the base station to configure one or more paging mechanisms so as to minimally disrupt existing paging mechanisms associated with at least one other base station within the network.

In one variant, the configuration of one or more paging mechanisms so as to minimally disrupt existing paging mechanisms associated with at least one other base station includes configuring the distributed base station to operate substantially within unused or underutilized portions of frequency spectrum allocated to the network and used by the at least one other base station.

In another variant, the distributed base station is a femtocell, and the at least one other base station is a fixed macrocell base station.

In a seventh aspect of the invention, a system for wireless communication is disclosed. In one embodiment, the system is part of a cellular network and includes a wireless base station and user equipment (UE), the base station being configured to determine an optimized paging mode and schedule, and transmit this information to the UE so that the latter can make use of the mode according to the schedule.

Other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 2 is a graphical representation of various prior art duplex methods including full-duplex FDD, half-duplex FDD and TDD.

FIG. 7 is a logical flow diagram of one exemplary embodiment of the generalized paging configuration process for base stations (BS) in accordance with the invention.

FIG. 8 is a logical flow diagram of one exemplary embodiment of the generalized paging configuration process for a client device (e.g., UE) in accordance with the invention.

FIG. 16 is a graphical representation of one exemplary schedule of time and paging resources for use with the 3GPP LTE network infrastructure embodiment of FIG. 11.

DETAILED DESCRIPTION OF THE INVENTION

Figure 1A:
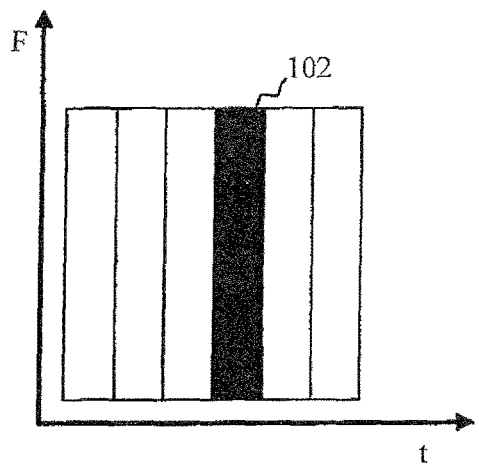
FIG. 1A is time and frequency plot of a typical prior art Time Division Multiple Access (TDMA) implementation.

Reference is now made to the drawings, wherein like numerals refer to like parts throughout.

Overview

In one aspect, the present invention discloses methods and apparatus for modifying wireless paging channel operation, based at least in part on one or more network parameters. This feature allows for example base stations to adjust bandwidth used for paging operations in order to compensate for (or target) various network constraints. Complementary features are disclosed enabling the distribution of paging channel operational parameters to user equipment (UE), and other network entities if desired. Such methods and apparatus are particularly useful for addressing the management of paging capabilities within networks having fragmented multi-band operational capabilities, and flexible resource allocation/utilization.

In one embodiment, methods and apparatus are disclosed wherein network parameters such as total cell bandwidth and bandwidth fragmentation, are evaluated by the base station to determine one or more paging transmission modes. In another embodiment, UE considerations such as UE capabilities, and outstanding RRC connections, may be considered.

In another aspect of the invention, methods and apparatus are disclosed wherein paging transmission modes specifying one or more paging configurations are signaled to the UE. In one embodiment, such paging transmission modes are broadcast within the cells via system information. In an alternative embodiment, such paging transmission modes are transmitted via a dedicated message (such as for example an RRC message). Additionally, provisions are disclosed for handling of asymmetric capabilities of UE populations.

In yet another aspect of the invention, methods and apparatus are disclosed wherein user equipment (UE) may configure one or more radio elements, based at least in part on a received paging configuration. In one such embodiment, a plurality of paging configurations are pre-defined within the user equipment, such that the user equipment selects (or is directed to select by proxy) one pre-defined configuration responsive to the receipt of a paging configuration indication.

In an alternate embodiment, a plurality of paging configurations are modifiable within the user equipment, such that the user equipment dynamically sets one or more paging configurations responsive to the receipt of the paging configuration settings.

Exemplary apparatus and methods for flexible paging mechanisms for use within an LTE-Advanced architecture are also disclosed.

Detailed Description of Exemplary Embodiments

Exemplary embodiments of the present invention are now described in detail. While these embodiments are primarily discussed in the context of a UMTS wireless network, and more specifically in one variant to fourth-generation ("4G") UMTS LTE and LTE-A networks, it will be recognized by those of ordinary skill that the present invention is not so limited. In fact, the various aspects of the invention are useful in any wireless network (whether cellular or otherwise) that can benefit from the configurable paging mechanisms described herein. For instance, the paging methodologies utilized within the WiMAX technology (sec inter alia IEEE Std. 802.16e dated 28 Feb. 2006 an entitled "*IEEE Standard for Local and metropolitan area networks—Part 16: Air Interface for Fixed and Mobile Broadband Wireless Access Systems—Amendment 2: Physical and Medium Access Control Layers for Combined Fired and Mobile Operation in Licensed Bands and Corrigendum 1*"), which is incorporated herein by reference in its entirety, may be readily adapted according to the methods described herein to facilitate enhanced paging capabilities.

In the following discussion, a cellular radio system comprises a network of radio cells each served by a transmitting station, known as a cell site or base station. The radio network provides wireless communications service for a plurality of transceivers (in most cases mobile). The network of base stations working in collaboration allows for wireless service which is greater than the radio coverage provided by a single serving base station. The individual base stations are connected by another network (in many cases a wired network), which includes additional controllers for resource management and in some cases access to other network systems (such as the Internet) or MANs.

In LTE there are two distinct types of base stations: eNodeB (eNB), and Home eNodeB (HNB). In prior cellular networks, the network of base stations was owned and or controlled by a single network operator entity. The 3GPP has introduced a new network element known as "Home Node B" (HNB). A Home Base Station (or Home NodeB, or Home eNodeB in 3GPP terminology) is a base station optimized for use in residential, corporate, or similar environments (e.g., private homes, public restaurants, small offices, enterprises, hospitals, etc., and hence the term "home" is not meant to be limiting to residential applications). In the present context, the terms "Home Base Station", "Home NodeB" (for UMTS), "Home eNodeB" (for LTE) refer generally to a "femtocell". In the present context, the terms base station, "NodeB", and "eNodeB" (for LTE) refer generally to a "macrocell".

Long Term Evolution (LTE) Paging Methods—

The current LTE specification defines several flexible multiple access methods to improve transmission over the air interface to increase potential transmission rates. LTE specifies Orthogonal Frequency Division Multiple Access (OFDMA) in combination with Time Division Multiple Access (TDMA) for downlink access. This hybrid access technique subsequently also called OFDMA/TDMA, is a multi-carrier multiple access method in which a subscriber is provided with a defined number of subcarriers in the frequency spectrum and a defined transmission time for the purpose of data transmission. LTE further specifies SC-FDMA (Single Carrier Frequency Division Multiple Access) in combination with TDMA for uplink access. Furthermore, LTE supports full-duplex FDD (frequency division duplexing), half-duplex FDD and TDD (time division duplexing). Lastly, LTE supports scalable bandwidth segments of one point four (1.4), three (3), five (5), ten (10), fifteen (15) and twenty (20) MHz.

Briefly, FIGS. 1A-1D summarize basic multiple access methods well understood in the wireless transmission arts, and used throughout this disclosure. In these figures, it will be recognized that time increases in the direction of a time axis (t), and frequency increases in the direction of a frequency axis (F).

FIG. 1A comprises a first time-frequency diagram illustrating a TDMA (time division multiple access) system. In TDMA, each mobile radio terminal may use the whole frequency band provided for the usage by the mobile radio terminals. However, for each mobile radio device, only a predefined transmission time interval (TTI) is allocated in which the mobile radio device may send and receive useful data. During a transmission time interval 102, only one mobile radio device is active in a radio cell.

Figure 1B:
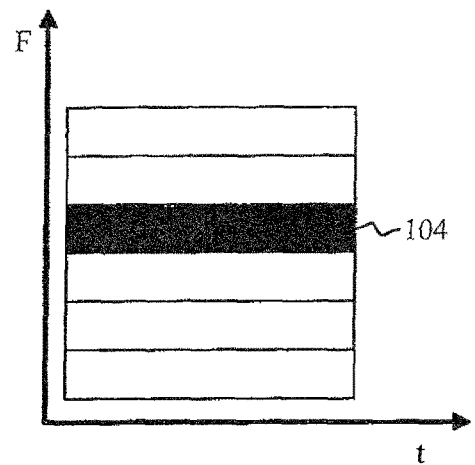
FIG. 1B is time and frequency plot of a typical prior art Frequency Division Multiple Access (FDMA) implementation.

FIG. 1B comprises a second time-frequency diagram illustrating a FDMA (frequency division multiple access) system. In FDMA, each mobile radio device may freely use the time domain, but only a predefined (narrow) frequency band 104 within the entire frequency band is available for sending and receiving useful data. Only one mobile radio device is active in each narrow frequency band of the radio cell at any given time.

Figure 1C:
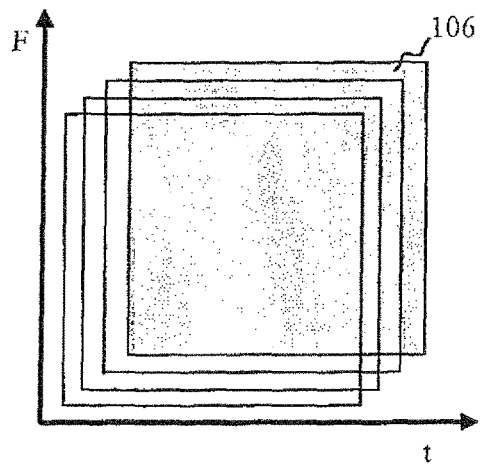
FIG. 1C is time and frequency plot of a typical prior art Code Division Multiple Access (CDMA) implementation.

FIG. 1C comprises a third time-frequency diagram illustrating a CDMA (code division multiple access) system. In CDMA (a sub-species of so-called "direct sequence" or DS systems), each mobile radio terminal may send and receive useful data during any time period, and may use the entire available frequency band. In order to avoid interference between the data sent by different senders, each mobile radio device is allocated a binary pseudo-noise code pattern 106. The code patterns which are allocated to the different mobile radio terminals are ideally orthogonal, and data sent by a mobile radio terminal or to be received by the mobile radio terminal is coded ("spread") by the code pattern allocated to the mobile radio terminal.

Figure 1D:
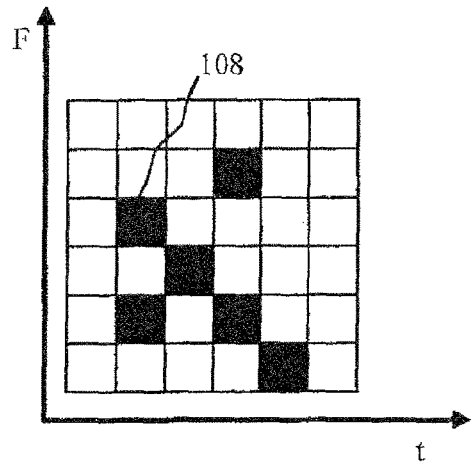
FIG. 1D is time and frequency plot of a typical prior art Orthogonal Frequency-Division Multiple Access (OFDMA) implementation used in combination with TDMA.

FIG. 1D illustrates an OFDMA (orthogonal frequency division multiple access) system in combination with TDMA. OFDMA is a special case of FDMA and is a multiple carrier method in which the entire frequency band having a bandwidth B is subdivided into M orthogonal sub-carriers 108. Thus, there are M (narrow) frequency bands each with a bandwidth of F=B/M. In OFDMA, a data stream to be sent is divided over a multiplicity of sub-carriers, and is transmitted (generally) in parallel. The data rate of each sub-carrier is accordingly lower than the overall data rate. For each mobile radio terminal, a defined number of sub-carriers 108 are allocated for data transmission. A chief advantage of OFDMA's flexible time-frequency resource allocation, over e.g., CDMA's flexible code allocation, is a higher spectral efficiency (i.e., more bits per unit time per unit of frequency bandwidth).

In LTE, downlink access based on OFDMA/TDMA data streams is subdivided in time to constant time intervals, or frames. Each frame is further subdivided into slots, and subframes. Not all subframes need to be in use (the network could be underutilized), but a subframe is the smallest incremental amount of time to be used for data transmission/reception with the transceivers. Once a transceiver has acquired the base station timing, subframes are allocated to each transceiver with a scheduling function.

FIG. 2 illustrates the aforementioned full-duplex FDD, half-duplex FDD and TDD according to the prior art. Full-duplex FDD uses two separate frequency bands for uplink 222 and downlink 220 transmissions, where both transmissions can occur simultaneously. Unlike FDD, TDD uses the same frequency band for transmission in both uplink 222 and downlink 220; however within a given time frame, the direction of transmission is switched alternatively between the downlink 220 and uplink 222. Half duplex FDD uses two separate frequency bands for uplink 222 and downlink 220 transmissions, similar to full-duplex FDD, but uplink and downlink transmissions are non-overlapping in time (similar to TDD).

Figure 3:
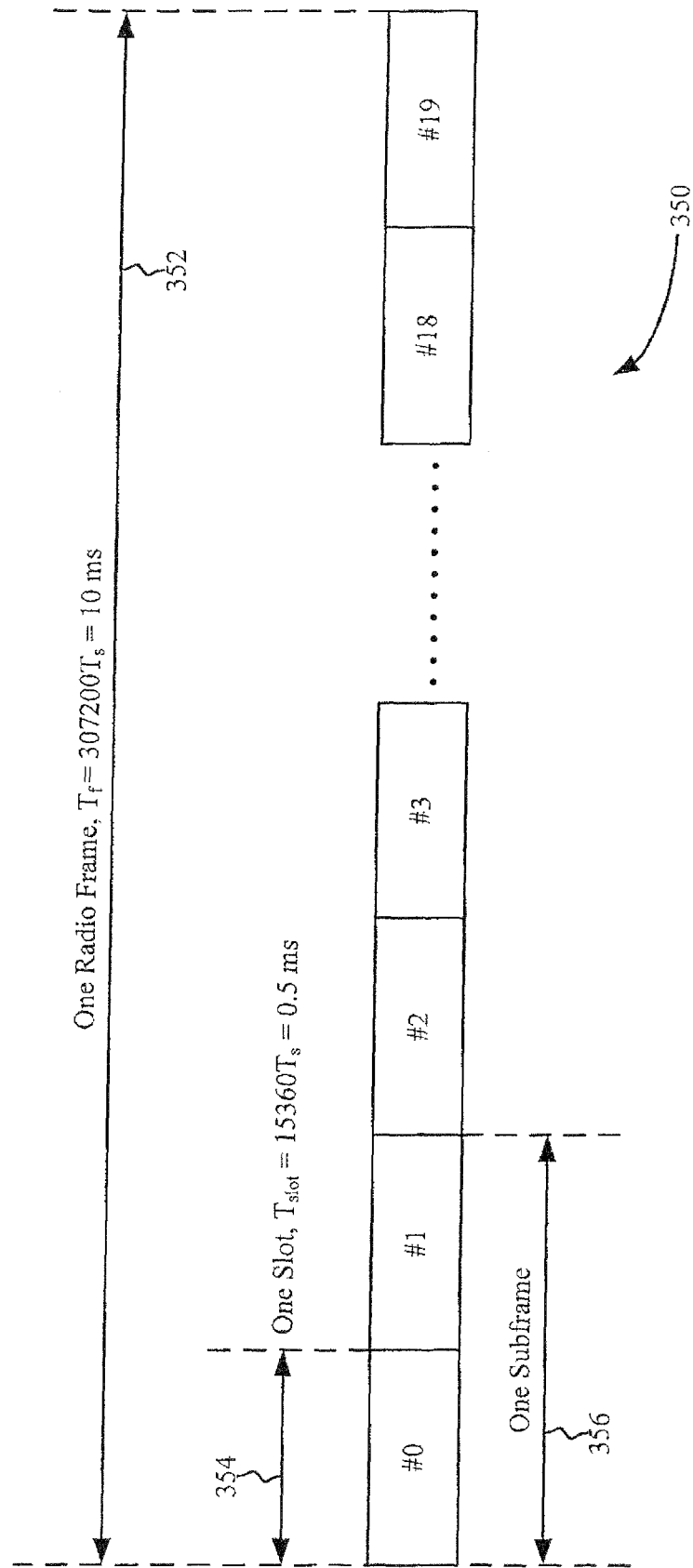
FIG. 3 is a graphical representation of an exemplary flame structure type for a prior art LTE FDD system.

LTE networks utilize a standard frame structure type 1 (one) 350 (as shown in FIG. 3) which is used in both full-duplex and half-duplex FDD. Each radio frame 352 is ten (10) ms in duration, and consists of twenty (20) slots 354 in 0.5 ms length intervals, numbered from 0 to 19. A subframe 356 is defined as two (2) consecutive slots 354. For FDD, ten (10) subframes are available for downlink transmission and ten (10) subframes are available for uplink transmissions in each ten (10) ms interval. Uplink and downlink transmissions are separated in the frequency domain. Depending on the slot format, a subframe consists of fourteen (14) or twelve (12) OFDMA symbols in downlink, and fourteen (14) or twelve (12) SC-FDMA symbols in uplink, respectively. Details of frame structure and timing are described in 3GPP TS 36.211 entitled "E-UTRA—Physical channels and modulation", the contents of which are incorporated herein by reference in its entirety.

Figure 4:
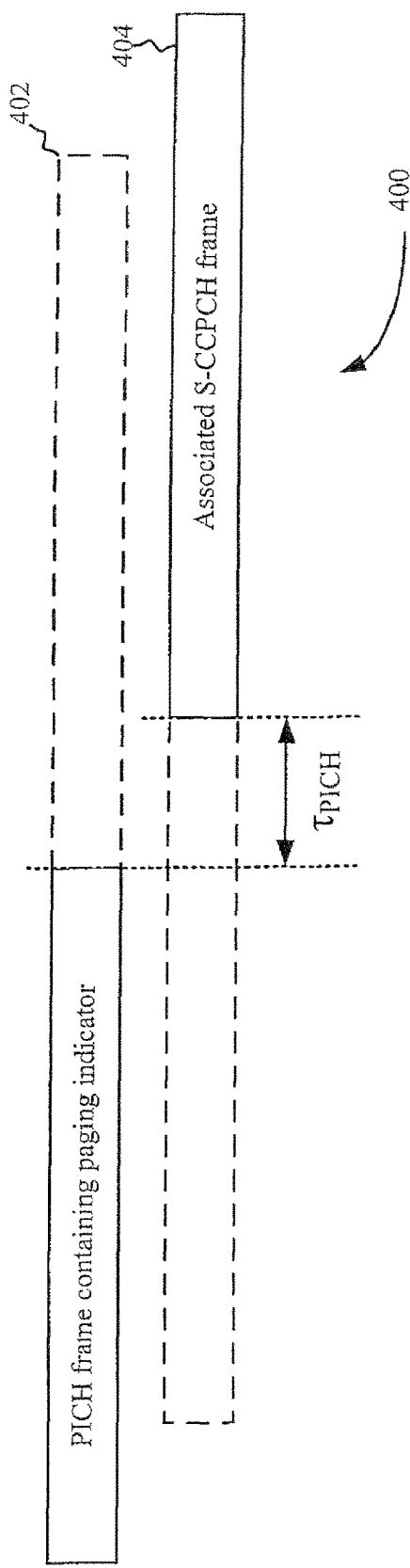
FIG. 4 is a graphical representation of prior art UMTS paging mechanism timing.

Referring now to FIG. 4, the paging timing 400 of UMTS W-CDMA operating in FDD mode is shown and described in detail. The UE monitors the Paging Indicator Channel (PICH) 402 at defined time instants (i.e. radio frames of length 10 ms). A pre-assigned paging identifier indicates (to the paged UE) that a paging message is pending on the secondary paging channel. Responsive to receiving its paging identifier, the UE then decodes the Secondary Common Control Physical Channel 404 (S-CCPCH) which follows the PICH at a fixed time distance $\tau_{PICH}$ (in an example, $\tau_{PICH}$=7680 chips=2 ms). The time distance is measured from when the PICH channel 402 is received. In the frequency-domain, the PICH and S-CCPCH are transmitted over the entire downlink bandwidth of 5 MHz.

Figure 5:
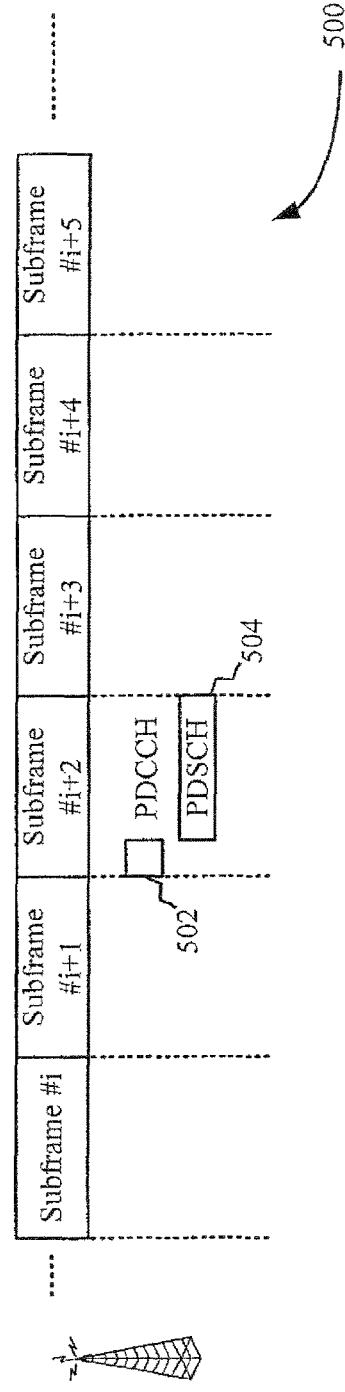
FIG. 5 is a graphical representation of a prior art LTE two-phase paging mechanism timing.

Referring now to FIG. 5, a two-stage paging mechanism 500 (similar to UMTS W-CDMA) is illustrated for LTE networks. The UE monitors the Physical Downlink Control Channel (PDCCH) 502 at defined time instants (i.e., defined subframes of length 1 ms). A paging identifier is assigned to the UE by the network. When the assigned paging identifier is detected on the PDCCH, the UE decodes the associated Physical Downlink Shared Channel (PDSCH) 504. As shown, the PDCCH is transmitted in subframe #i+2; occupying one (1), two (2), or three (3) OFDMA symbols of the first slot, where the number of symbols is dynamically adjusted by network. The PDSCH 504 is transmitted in the remainder of subframe #i+2, and occupies the OFDMA symbols in the subframe that are not used by the PDCCH.

Figure 6:
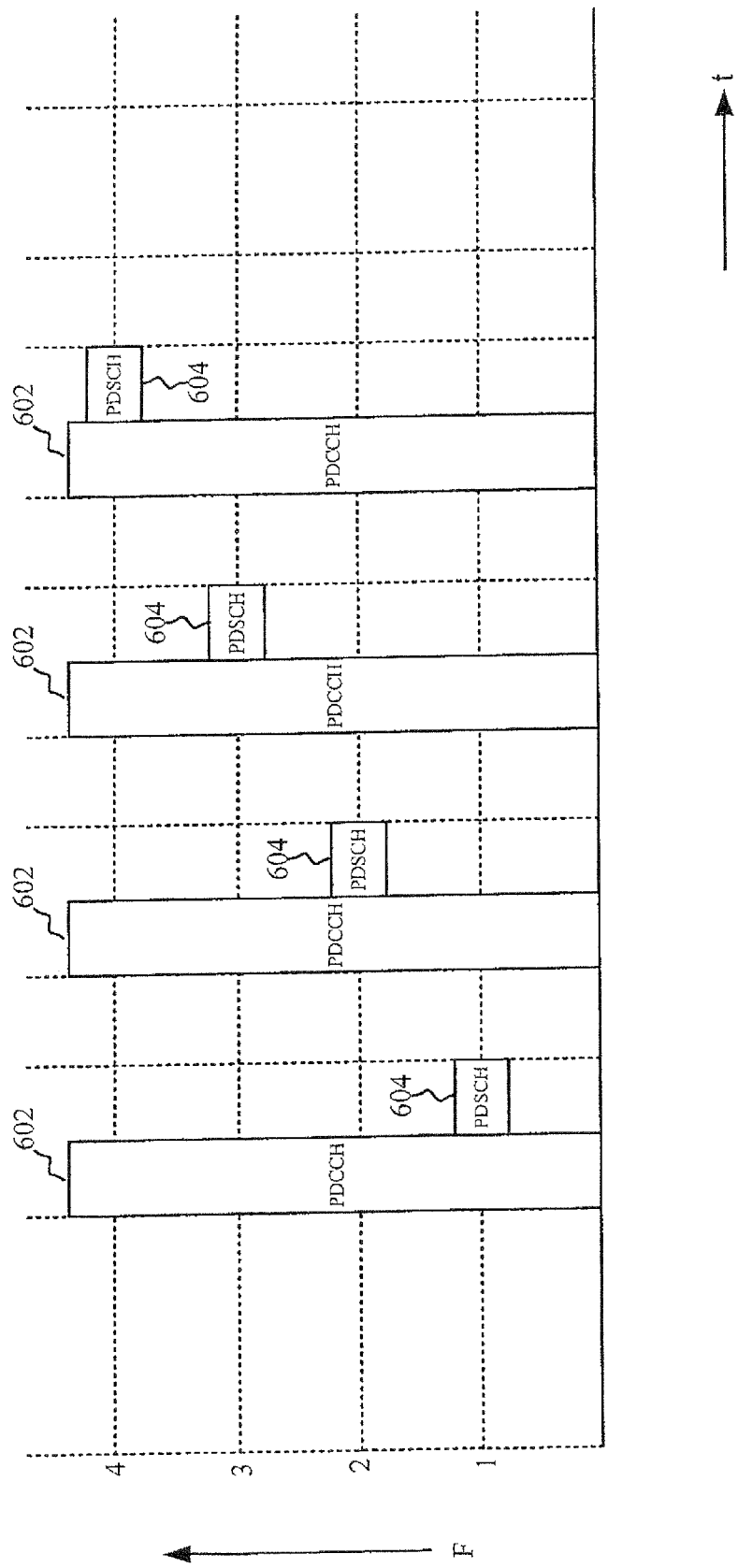
FIG. 6 is a graphical representation of one exemplary schedule of time and paging resources for a prior art LTE two-phase paging mechanism.

FIG. 6 is a graphical illustration of one exemplary schedule of the two-stage paging mechanism 600, shown with respect to frequency and time. In the frequency domain, the PDCCH is transmitted over the entire downlink bandwidth of the cell, whereas the PDSCH is transmitted only over a definite number of Resource Blocks (RB) (a RB corresponds to twelve (12) subcarriers) within the downlink bandwidth of the cell.

Methods—

Referring now to FIGS. 7 and 8, exemplary embodiments of the generalized methods of generating and receiving paging modes according to the invention are described.

In one exemplary embodiment, paging modes in a cellular radio system are selected for use, according to a plurality of different modes based on a variety of network parameters. Specifically, as shown in the method 700 of FIG. 7, the BS identifies one or more controlling network parameters per step 702. In some embodiments, the controlling network parameters may be maintained in a localized database of the BS (or a connected network entity). In alternate embodiments, the parameters may be retrieved or messaged to the BS from a centralized network controller. The network parameters may be related to known network capabilities; however in some scenarios, the BS may be required to query or receive UE information dynamically (e.g., periodically or in response to the occurrence of a particular event).

Exemplary network parameters useful with the method of FIG. 7 might comprise for example (and without limitation): (i) total cell bandwidth (i.e., for the cell under consideration), (ii) level of bandwidth fragmentation, and/or (iii) one or more characteristics of the population of UEs (e.g., capabilities of devices such as radio frequency ("RF") capabilities of the UEs, total devices serviced and/or RRC connection states), and any combination thereof. Moreover, support of legacy devices may be weighted as being more or less important than support of more recent devices; this weighting may also be altered dynamically or based on other network conditions (e.g., legacy devices are weighted more heavily in one circumstance such as time-of-day, fraction of total UE population, etc., and less heavily in another). The multitude and complexity of interrelated network parameters can also be evaluated by the BS prior to determination of the optimal paging modes. The near limitless variety of network parameters that may be considered as part of such analysis will be recognized by those of ordinary skill given the present disclosure.

At step 704, the BS determines one or more paging modes based at least in part on the one or more determined network parameters described above. The plurality of paging transmission modes are in the exemplary embodiment defined such that each transmission mode specifies the configuration of one or more particular UE operating parameters. Such UE operating parameters may comprise for instance resource allocations and/or paging mode types, as described in greater detail subsequently herein.

To this end, the present invention contemplates in one variant the use of a hierarchical or other weighting algorithm which can, inter alia, determine and assign the appropriate weighting for network parameters in the determination of appropriate paging modes. For instance, a frequency band supporting many users may be required to allocate a significant amount of bandwidth for paging channels, whereas a frequency band having only few users may allocate less bandwidth for paging, or vice versa. In a similar vein, dedicated paging resources may be adaptively enlarged or shrunk to accommodate very dynamic subscriber demands (such as near a high mobility area; e.g., a train station, airport).

Network parameter analysis can be based on any number of paradigms; e.g., a running analysis of actual network activity, prior knowledge of the network activity (for example, that stored in memory, or distributed over the inter-cell communication network), etc. In this fashion, the base station (BS) of the present invention can dynamically optimize the selection of paging modes it uses. This dynamic optimization may be conducted on a per-base station basis (i.e., each base station in effect determining its own paging operation), or also in a more concerted fashion (such as between a number of contiguous cells, or even the network as a whole).

It will be appreciated that the network parameters such as those referenced above may change on a regular (e.g., periodic) or irregular basis, or correlated with the occurrence of certain events. In certain periodic instances, such as during peak hour operation, the BS may expect to devote more paging resources to handle increased call traffic. In other instances, the BS may simply detect that paging resources may be required, such as at a train stop, or near an airport (e.g., relatively a periodic operation, but with sudden drastic increases in radio connections such as when a train or airplane full of passengers arrives). These changes to the network parameters may be either detected directly by the BS (e.g., the BS may determine that the amount of paging messages to be transmitted exceeds the capabilities of the current allocation of paging resources, etc.) or alternately be messaged or signaled to the BS from another entity within or external to the network.

Resource allocation is highly advantageous when considering systems having fragmented frequency bands (i.e., cases where multiple frequency bands are being served by the same BS). For example, if legacy devices are only capable of reception of a subset of the frequency bands, then their corresponding paging modes may be limited to that subset. In addition, the BS may choose to limit enhanced devices (or subsets thereof) to only receive paging messages on an "enhanced devices only" or other designated frequency bands, thus maximizing spectral usage for both legacy and enhanced devices. The possibilities for sharing/partitioning of frequency band(s) for paging messages in the context of flexible resource allocations are nearly limitless.

Resource allocations may include for example carrier frequencies, time slots, or code channels dedicated for paging messages. In one embodiment, the BS can specify the maximum bandwidth size of the frequencies for the paging identifier and paging message. In another embodiment, the BS can specify the times or subframes that the paging identifier and paging message are transmitted. In certain embodiments, the resulting paging schedule for each of the resultant paging transmission modes does not overlap in time or frequency with other modes.

Furthermore, paging mode types may define methods for how and when paging messages are received by the UE. For instance, the BS may select a first method for paging message delivery for connected UEs (e.g., RRC "connected" state), and a second method for paging message delivery for idle (e.g., RRC "idle" state) UEs. Additionally, the BS may select one or more of a plurality of methods for paging indication delivery for various services, or for various UE types, dependent upon other UE-specific parameters.

For example, a UE which is operating with an active radio link may receive a plurality of specifically addressed paging indications, each corresponding to various services, or network notifications. Such targeted delivery requires some amount of UE processing, but ensures that minimal additional network bandwidth is consumed for administrative needs. Conversely, UEs which are idle may only periodically monitor for paging indications, thus their paging indications may be broadcast to minimize power consumption (e.g., the UE only receives simple "flags", and does not need to fully process the paging channel).

In an alternate embodiment, the BS "community" (i.e., two or more designated BSs that cooperate) can directly communicate among one another to exchange paging configurations. Such communications can occur over literally any type of communications or network interface, whether wired or wireless, and ideally is supported via extant communication channels between the base stations that support operation of the cellular network. Such embodiments may be particularly useful with femtocell operation, wherein only a portion of the network (e.g. master network) may have access to the network parameters. In such embodiments, the femtocell may directly receive either the network parameters from the network, or conversely, may receive the determined output paging configurations.

Furthermore, the level of possible/meaningful information exchange between base stations may be adjusted. For instance, the network may allow a femtocell to provide various degrees of paging indications, such as to enable specific optional services (e.g. advertising, fleet tracking, etc.). Alternatively, femtocell paging state machines may be significantly simplified, to allow legacy device interoperation. Lastly, some services may always be supported such as emergency calls; in such embodiments a BS which does not support legacy devices, may still be required to support legacy emergency calls.

At step 706, the BS signals the paging modes to one or more UE devices. In one embodiment, this is accomplished via a broadcast to all UEs (i.e., to all UEs currently located in the cell via system information). In an alternate embodiment, the BS may signal the UE via a dedicated message (e.g., via an RRC connection). In one variant, the paging transmission modes are pre-designated in the system, and a mode identifier is signaled (rather than signaling each of the various operating parameters individually).

Figure 7A:
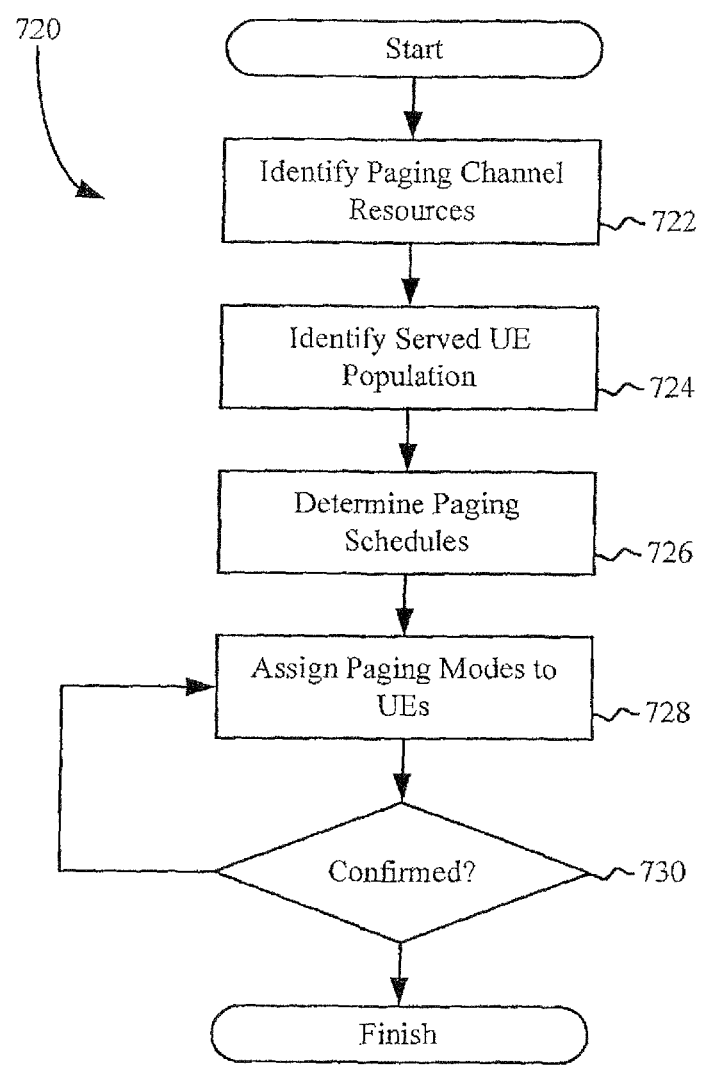
FIG. 7A is a logical flow diagram of one specific implementation of the generalized method of FIG. 7.

Referring now to FIG. 7A, one implementation-specific embodiment of the generalized method of generating paging modes of FIG. 7 is described.

As shown in the method 720 of FIG. 7A, at step 722, the BS identifies four (4) distinct frequency bands which can be used for service provision based on its current location. The BS furthermore (e.g., after consultation with a Core Network) selects only two (2) of the frequency bands, to provide a first basic service (e.g. voice), and a second augmented service (e.g. data).

At step 724, the BS identifies the population of UEs which support enhanced operation. At this step, the BS may query the core network or the UEs to establish the population capabilities. If the BS determines that a portion of the population of UEs supports enhanced operation (and that such operation is advantageous), then the BS initiates an optimization algorithm of step 726.

At step 726, the BS determines several paging schedules. For example, one such paging schedule might involve paging notifications for the legacy devices that will be transmitted on all legacy frequency bands, with a subset of the frequency bands and time slots reserved for enhanced device paging. Consequently, the new paging mode will enable the BS and UEs to efficiently utilize spectrum (i.e., by recapturing resources which would otherwise be wasted on paging), while simultaneously minimizing UE power consumption (by minimizing the resources necessary for paging channel reception).

At step 728, the BS updates the enhanced UEs with appropriate paging schedules via a broadcast or particularly addressed message (e.g., delivered over the Physical Downlink Shared Channel (PDSCH)), so that the enhanced UEs may adjust their operation accordingly.

At step 730, the BS receives confirmation from the UEs, indicating their appropriate paging configuration.

Referring now to the method 850 of FIG. 8, a UE receives an indication of the paging modes applicable to its serving BS per step 852. In one embodiment, this is accomplished via reception of a predefined broadcast via system information. Alternatively, in another embodiment, the UE receives an indication of the paging modes via a dedicated message (e.g., via RRC connection).

At step 854, the UE determines (or is instructed as to) the appropriate method of paging operation. In one embodiment ("UE passive" mode), the UE is directly assigned a paging mode of operation by the base station. In one such variant, the UE receives a message assigning to it a paging mode of operation. In another such variant, the UE receives a message assigning a default paging mode of operation. Default modes of operation may be necessary to ensure at least a minimal level of backward compatibility for user populations which include some portion of legacy UEs.

In an alternative embodiment ("UE active" mode), the UE is allowed to select one or more paging modes of operation from the network. In one such variant, the UE identifies its preferred paging mode based on considerations such as application requirements, processor capabilities, power consumption (e.g., desired consumption rate, remaining battery life, etc.), supported modem options, etc.

In another such embodiment ("UE cooperative" mode), the UE and base station actively negotiate for mutually beneficial paging mode operation.

It will further be recognized that the UE may be configured to determine its paging mode statically, or alternatively it may dynamically or periodically revisit its paging mode assignment or determination. In one such "static" embodiment, the UE may peruse the paging mode options, and set its paging mode once. In one "dynamic" embodiment, the UE may periodically or based on situation peruse the paging mode options, and set its paging mode based on one or more dynamic system requirements.

In another similar embodiment, the UE may peruse the supported paging modes in response to internal requirements for applications. In one such case, the UE may enter a low power mode operation (e.g., sleep mode), and adjust its paging mode to the minimal paging update mode supported by the network. In contrast, during high speed operation (e.g., as within a vehicle) or other modes requiring more frequent updates, the UE may upgrade its paging mode to the most frequent paging updates available from that BS.

At step 856 of the method 850, the UE updates its internal operating protocol, and configures its corresponding radio interface to begin receiving paging notifications in accordance with the determined paging mode. In one such embodiment, the UE updates an internal schedule identifying times and frequency bands for discontinuous reception (DRX) operation. DRX operation is generally well known throughout the cellular arts; the UE and the network negotiate phases in which data transfer happens—otherwise the receiver turns off and enters a low power state. See, inter alia, "Universal Mobile Telecommunications System (UMTS); UE Procedures in Idle Mode and Procedures for Cell Reselection in Connected Mode", 3GPP TS 25.304 version 5.1.0, and "Universal Mobile Telecommunications System (UMTS); UTRAN Iu interface RANAP signaling", 3GGP TS 25.413 version 5.1.0, each of the foregoing being incorporated herein by reference in its entirety, for additional information on DRX within a UMTS network.

Figure 8A:
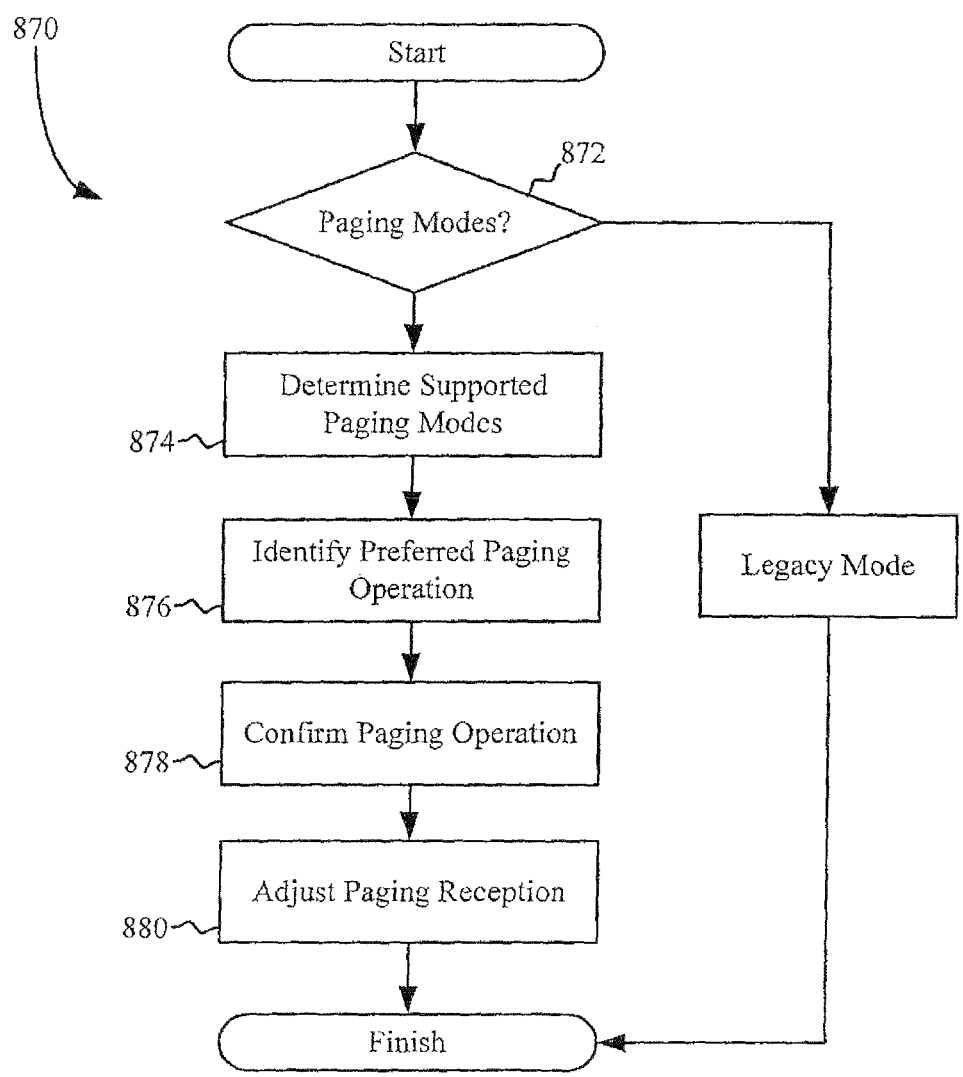
FIG. 8A is a logical flow diagram of one specific implementation of the generalized method of FIG. 8.

Referring now to FIG. 8A, one implementation-specific embodiment of the generalized method of receiving paging modes according to the FIG. 8 is described.

As shown in the method 870 of FIG. 8A, at step 872, a UE enabled according to the present invention initializes itself in the legacy operation. Once this UE has established itself on the network via common registration methods, the UE checks to see if the serving BS provides enhanced paging channel operation. If the BS provides paging channel operation, then the UE identifies itself (and optionally its capabilities) to the BS.

At step 874, the UE receives a broadcast or other paging message which indicates an appropriate paging schedule.

At step 876, the UE determines its preferred paging schedule. For example, the UE may decide that it would prefer to operate in enhanced operation, to save on power consumption.

At step 878, the UE confirms to the BS that it is operating within the specified paging configuration.

At step 880, the UE adjusts its paging reception. For example, the UE may adjust its receiver according to one or more times and one or more frequency bands available for discontinuous reception (DRX); e.g., to only receive the fourth subframe, of every frame of the second frequency band, or another such scheme.

Exemplary Serving Base Station Apparatus—

Figure 9:
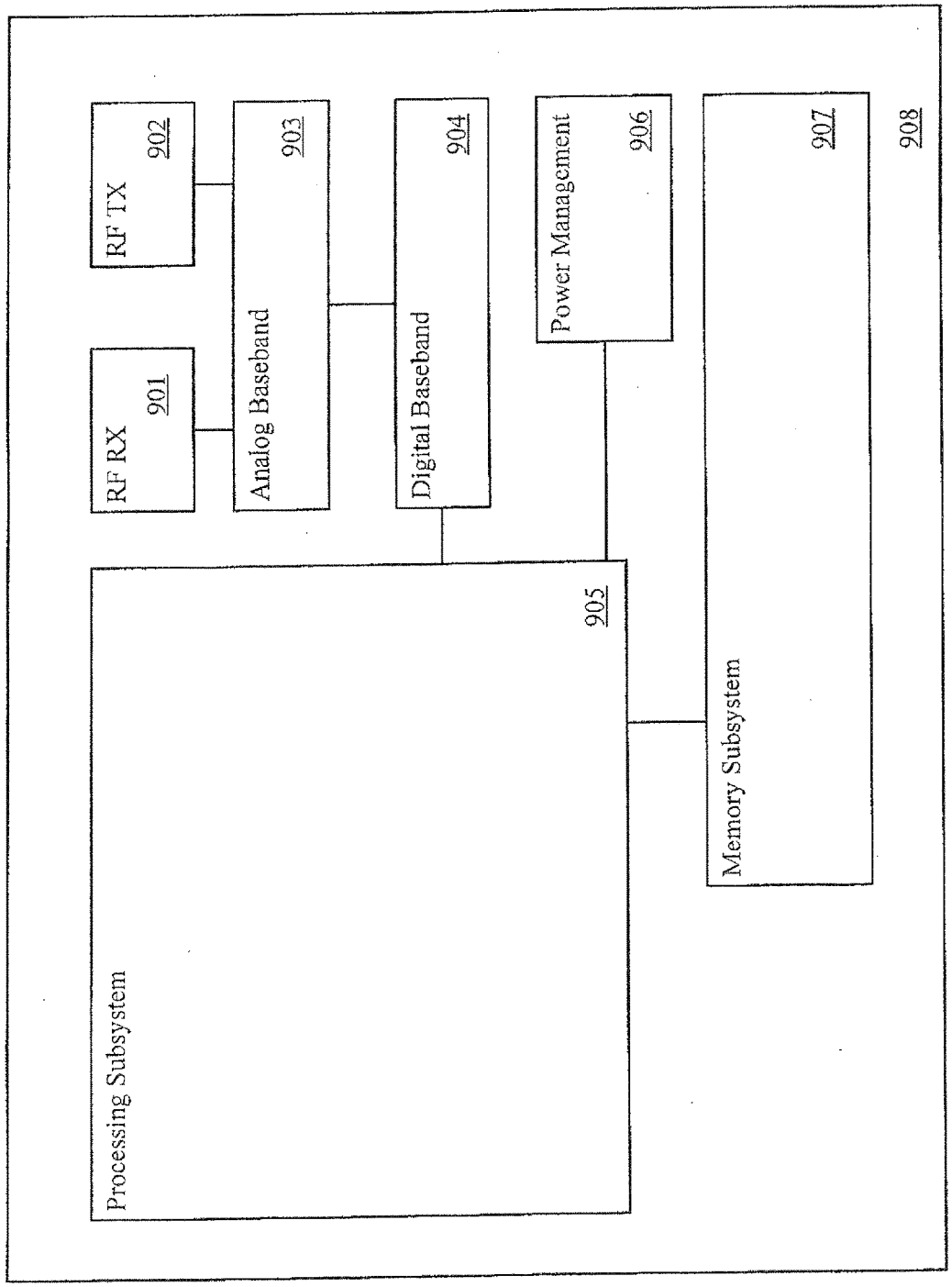
FIG. 9 is a functional block diagram illustrating one embodiment of a base station apparatus adapted to implement the methods of the present invention.

Referring now to FIG. 9, one embodiment of serving base station apparatus 900 useful in implementing the methods of the present invention is illustrated. The base station apparatus 900 comprises one or more substrate(s) 908 that further include a plurality of integrated circuits including a processing subsystem 905 such as a digital signal processor (DSP), microprocessor, gate array, or plurality of processing components as well as a power management subsystem 906 that provides power to the base station 900. As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, and ROM), digital processors, SoC devices, FPGAs, ASICs, ADCs, DACs, transceivers, memory controllers, and other devices, as well as any combinations thereof.

The embodiment of the apparatus 900 shown in FIG. 9 at a high level comprises a modem circuit configured to indicate one or more paging modes of operation to the wireless network, and transmit paging messages in accordance with the one or more selected paging modes of operation. The modem subsystem comprises a digital baseband 904, analog baseband 903, and RF components for RX 901 and TX 902. While multiple subsystems are illustrated, it is appreciated that future developments may consolidate the modem subsystem, in whole or in part.

The processing subsystem 905 may comprise a plurality of processors (or multi-core processor(s)). As used herein, the term "processor" is meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microproessors, and application-specific integrated circuits (ASICs). Such digital processors may be contained on a single unitary IC die, or distributed across multiple components.

Additionally, the processing subsystem also comprises a cache to facilitate processing operations. In the illustrated embodiment, the processing subsystem additionally comprises functional subsystems or modules for: (i) determining network parameters, (ii) determining paging modes, and distributing paging modes to UEs. These subsystems may be implemented in software, firmware and/or hardware, and are logically and/or physically coupled to the processing subsystem. As used herein, the terms "software" and "computer program" are meant to include any sequence or human or machine cognizable steps which perform a function. Such program may be rendered in virtually any programming language or environment.

Alternatively, in another variant, the subsystems or modules may be directly coupled to the transmitter of the subsystem. The illustrated embodiment of the apparatus logically connects the network determination subsystem, the paging mode determination subsystem, and the UE paging management subsystem.

In one embodiment, the network determination subsystem comprises a database or memory structure localized within the apparatus 900 adapted to store one or more network parameters. In alternate embodiments, the subsystem may comprise one or more interfaces to a centralized network controller, adapted for receiving messages comprising one or more network parameters. In yet another embodiment, the network parameters may be related properties which are queried or received from user equipment dynamically (e.g., UE paging mode capabilities).

The paging mode determination subsystem may include for example monitoring apparatus for network activity, or memory apparatus adapted to store knowledge of the network activity. The input network parameters are provided to an optimization engine (e.g., algorithm) for dynamically optimizing the selection of paging modes. It will be appreciated that the network parameters may change on a regular or irregular basis; thus, the optimization engine may be run in response to corresponding changes if desired. Furthermore, the paging mode determination subsystem may additionally include one or more interfaces adapted to exchange information with neighboring base stations or other network entities.

The UE paging management subsystem includes in one embodiment apparatus for broadcasting paging modes to all or a subset of the UEs (i.e., to all UEs currently located in the cell as determined by their system information). In an alternate embodiment, the BS is configured to directly address a paging mode to a particular UE via a dedicated message (e.g. RRC connection).

The processing subsystem 905 is preferably connected to a memory subsystem 907. As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM. The memory subsystem of the embodiment illustrated in FIG. 9 comprises a direct memory access (DMA), operational random access memory (RAM), and non-volatile memory.

Exemplary UE Apparatus—

Figure 10:
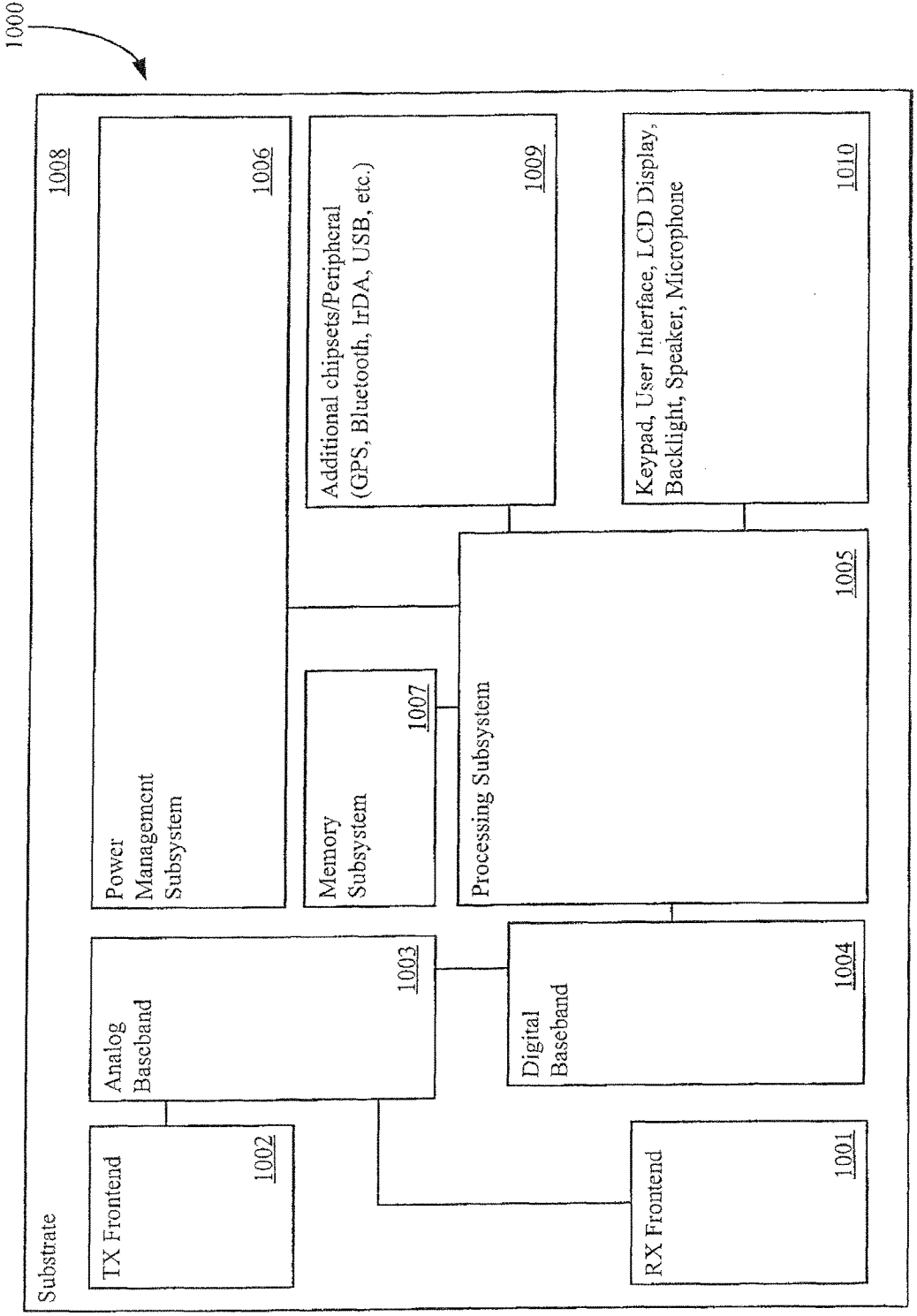
FIG. 10 is a functional block diagram illustrating one embodiment of a client device (e.g., UE) adapted to implement the methods of the present invention.

Referring now to FIG. 10, exemplary client or UE apparatus 1000 useful in implementing the methods of the present invention is illustrated. As used herein, the terms "client" and "UE" include, but are not limited to cellular telephones, smartphones (such as for example an iPhone™), personal computers (PCs), such as for example an iMac™, Mac Pro™, Mac Mini™ or MacBook™, and minicomputers, whether desktop, laptop, or otherwise, as well as mobile devices such as handheld computers, PDAs, personal media devices (PMDs), such as for example an iPod™, or any combinations of the foregoing. The configuration of paging mode reception is preferably performed in software, although firmware and/or hardware embodiments are also envisioned; this apparatus is described subsequently herein with respect to FIG. 10.

The UE apparatus 1000 comprises a processor subsystem 1005 such as a digital signal processor, microprocessor, field-programmable gate array, or plurality of processing components mounted on one or more substrates 1008. The processing subsystem may also comprise an internal cache memory. The processing subsystem 1005 is connected to a memory subsystem 1007 comprising memory which may for example, comprise SRAM, flash and SDRAM components. The memory subsystem may implement one or a more of DMA type hardware, so as to facilitate data accesses as is well known in the art. In the illustrated embodiment, the processing subsystem additionally comprises subsystems or modules for: receiving indications of paging modes, determining appropriate paging modes, and configuring the modem. These subsystems may be implemented in software or hardware which is coupled to the processing subsystem. Alternatively, in another variant, the subsystems may be directly coupled to the digital baseband. The illustrated embodiment logically or physically couples the paging mode reception subsystem, the paging mode determination subsystem, and the modem configuration subsystem, although other architectures may be used.

An exemplary UE decodes a message from the BS, the message instructing the UE to set or change paging modes via a paging mode message. Thus, the paging mode reception subsystem or module may additionally include a memory for retrieving paging mode configurations that are pre-stored. Alternatively (or additionally), the paging mode reception subsystem may include an interface for receiving paging mode indications, which are directly messaged to the UE.

In one embodiment, the paging mode determination subsystem includes one or more processing elements adapted to identify its preferred paging mode based on considerations such as application requirements, processor capabilities, power consumption, supported modem options, etc. In another embodiment, the paging mode determination subsystem includes one or more apparatus suited for exchanging and negotiating one or more paging parameters with the network.

The modem configuration subsystem comprises in one embodiment an internal schedule identifying times and frequency bands for discontinuous reception (DRX). In alternate embodiments, the modem configuration subsystem 1005 may comprise one or more internal programs adapted to adjust paging mode operation by restricting paging reception to a subset of physical resources (e.g., time slots, frequency bands, etc.)

The radio/modem subsystem comprises a digital baseband 1004, analog baseband 1003, TX frontend 1002 and RX frontend 1001. The apparatus 1000 further comprises an antenna assembly, the selection component may comprise a plurality of switches for enabling various antenna operational modes, such as for specific frequency ranges, or specified time slots. While specific architecture is discussed, in some embodiments, some components may be obviated or may otherwise be merged with one another (such as RF RX, RF TX and ABB combined, as of the type used for 3G digital RFs) as would be appreciated by one of ordinary skill in the art given the present disclosure.

The analog baseband 1003 typically controls operation of the radio frontends therefore; the digital baseband modem 1004 loads the analog baseband 1003 with parameters for the reception of paging messages. The selection component may be controlled by the analog baseband 1003 to receive paging messages to offload such controlling functions from the digital baseband modem.

The illustrated power management subsystem (PMS) 1006 provides power to the UE, and may comprise an integrated circuit and or a plurality of discrete electrical components. In one exemplary portable UE apparatus, the power management subsystem 1006 advantageously interfaces with a battery.

The user interface system 1010 comprises any number of well-known I/O including, without limitation: a keypad, touch screen, LCD display, backlight, speaker, and microphone. However, it is recognized that in certain applications, one or more of these components may be obviated. For example, PCMCIA card type UE embodiments may lack a user interface (as they could piggyback onto the user interface of the device to which they are physically and/or electrically coupled).

The apparatus 1000 further comprises optional additional peripherals 1009 including, without limitation, one or more GPS transceivers, or network interfaces such as IrDA ports, Bluetooth transceivers, USB, Firewire, etc. It is however recognized that these components are not necessarily required for operation of the UE in accordance with the principles of the present invention.

Exemplary LTE Network—

Figure 11:
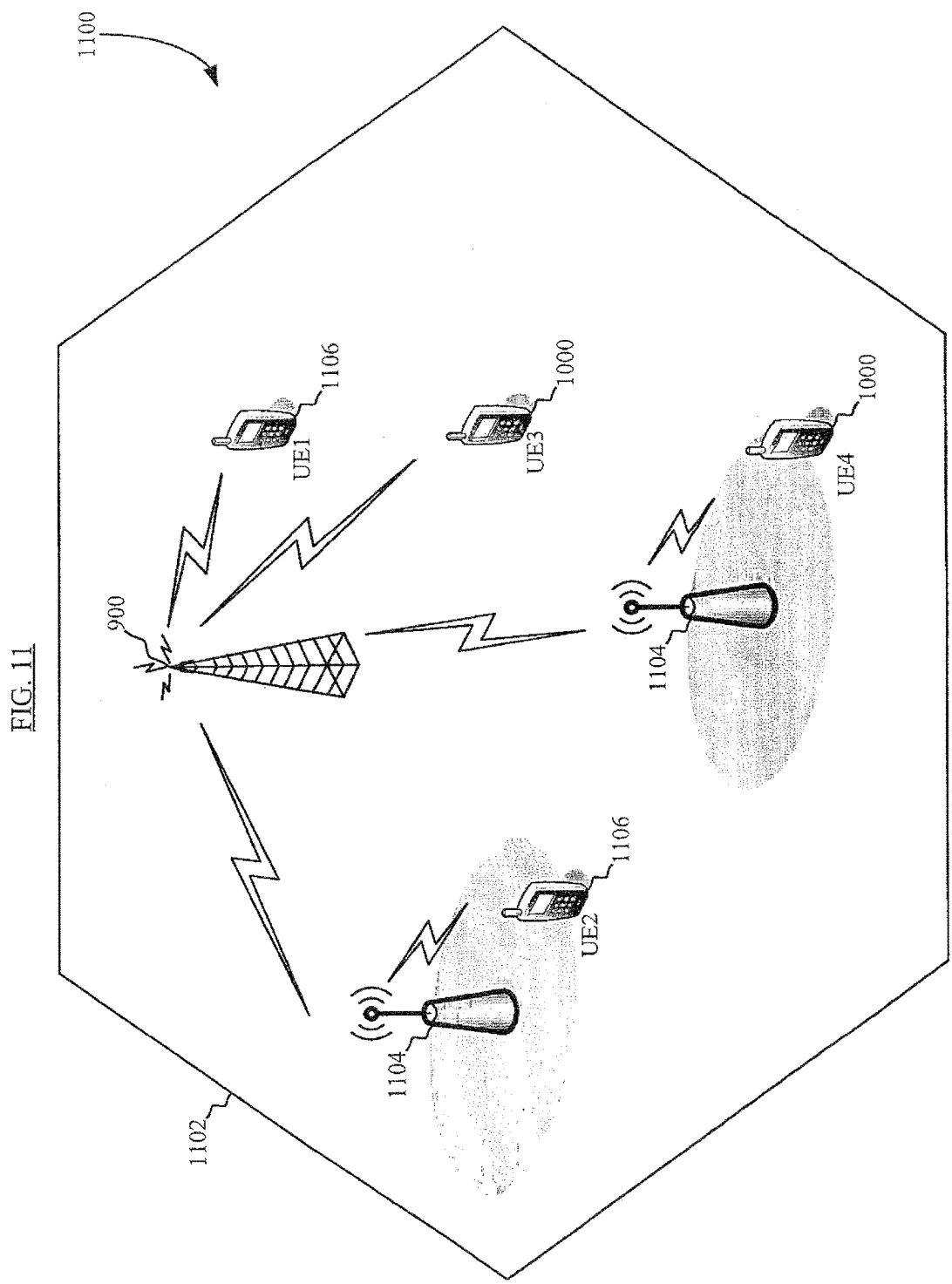
FIG. 11 is a graphical illustration of an exemplary OFDMA cellular system implementing 3GPP LTE technology in accordance with one embodiment of the invention.

FIG. 11 illustrates an exemplary LTE-A network. Coverage of the cell 1102 is provided by a base station 900 (e.g. LTE-A eNodeB). The eNodeB supports direct connections to/from either LTE-A UEs 1000, or legacy LTE UEs 1106. Relay nodes 1104 (referred to as NodeRs) may be readily deployed in the cell for providing additional coverage at cell-edges or coverage holes. UEs can communicate with the eNodeB in the uplink and downlink directions through the intermediate NodeRs.

Figure 12:
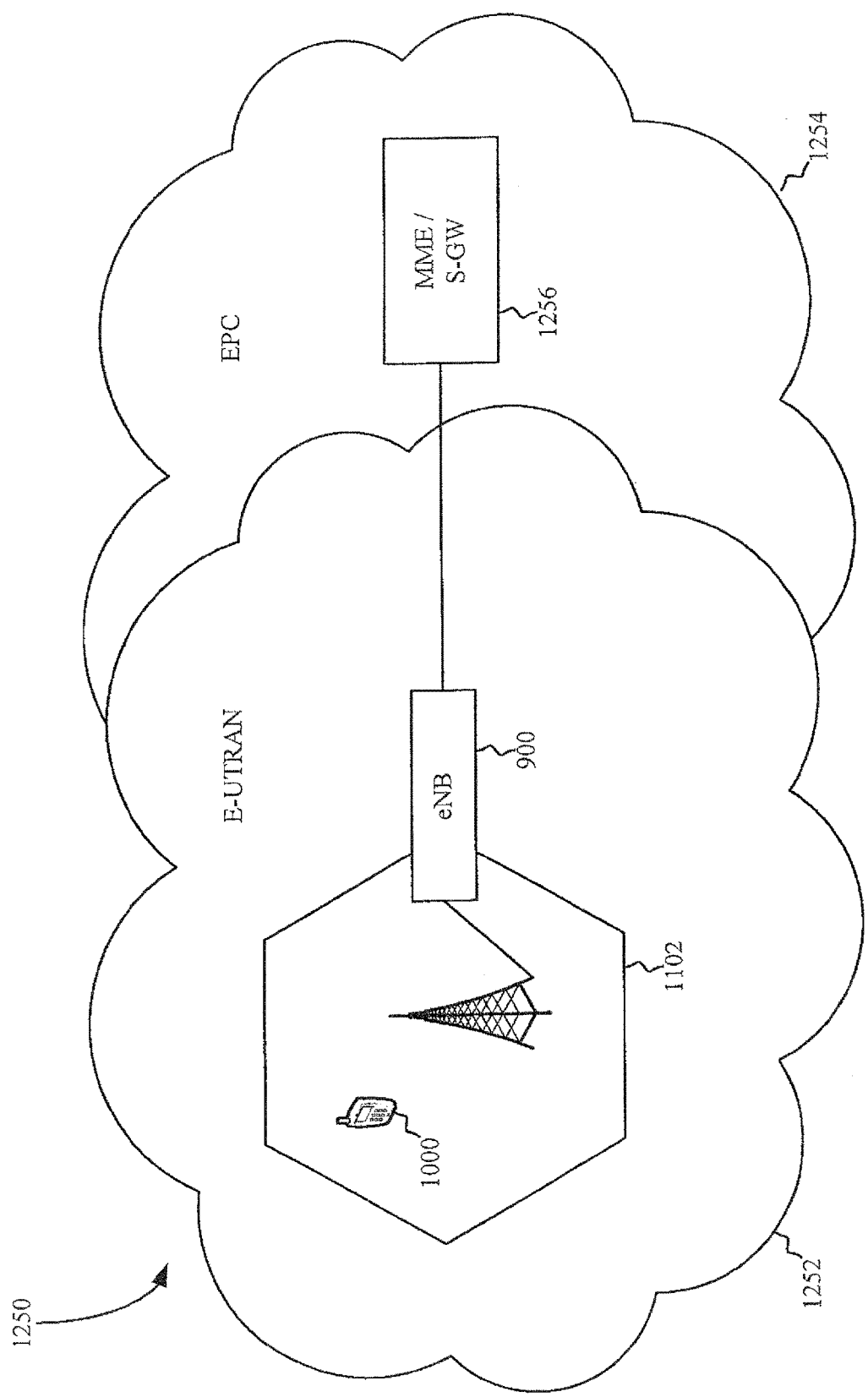
FIG. 12 is a graphical illustration of an exemplary 3GPP LTE network infrastructure adapted to operate in accordance with one embodiment of the invention.

FIG. 12 illustrates the high-level network architecture for LTE useful for, inter alia, implementing the paging mechanism methodologies described subsequently herein. As shown in FIG. 12, an LTE system 1250 comprises the radio access network E-UTRAN 1252 (Evolved UMTS Terrestrial Radio Access Network) and the core network EPC 1254 (Evolved Packet Core). The E-UTRAN 1252 comprises a plurality of base transceiver stations, eNodeB (eNBs) 900. The eNB 900 is connected in the exemplary embodiment to the EPC 1254 (Evolved Packet Core) which comprises the MME (Mobility Management Entity) and the Serving Gateway (S-GW) 1256. The MME is responsible for controlling the mobility of UEs located in the coverage area of E-UTRAN 1252, while the S-GW is responsible for handling the transmission of user data between UEs and network. Details of the radio access network and air interface for LTE systems are described in, inter alia, 3GPP Technical Specification TS 36.300 entitled "*E-UTRA and E-UTRAN: Overall description; Stage 2*", which is incorporated herein by reference in its entirety.

Figure 13:
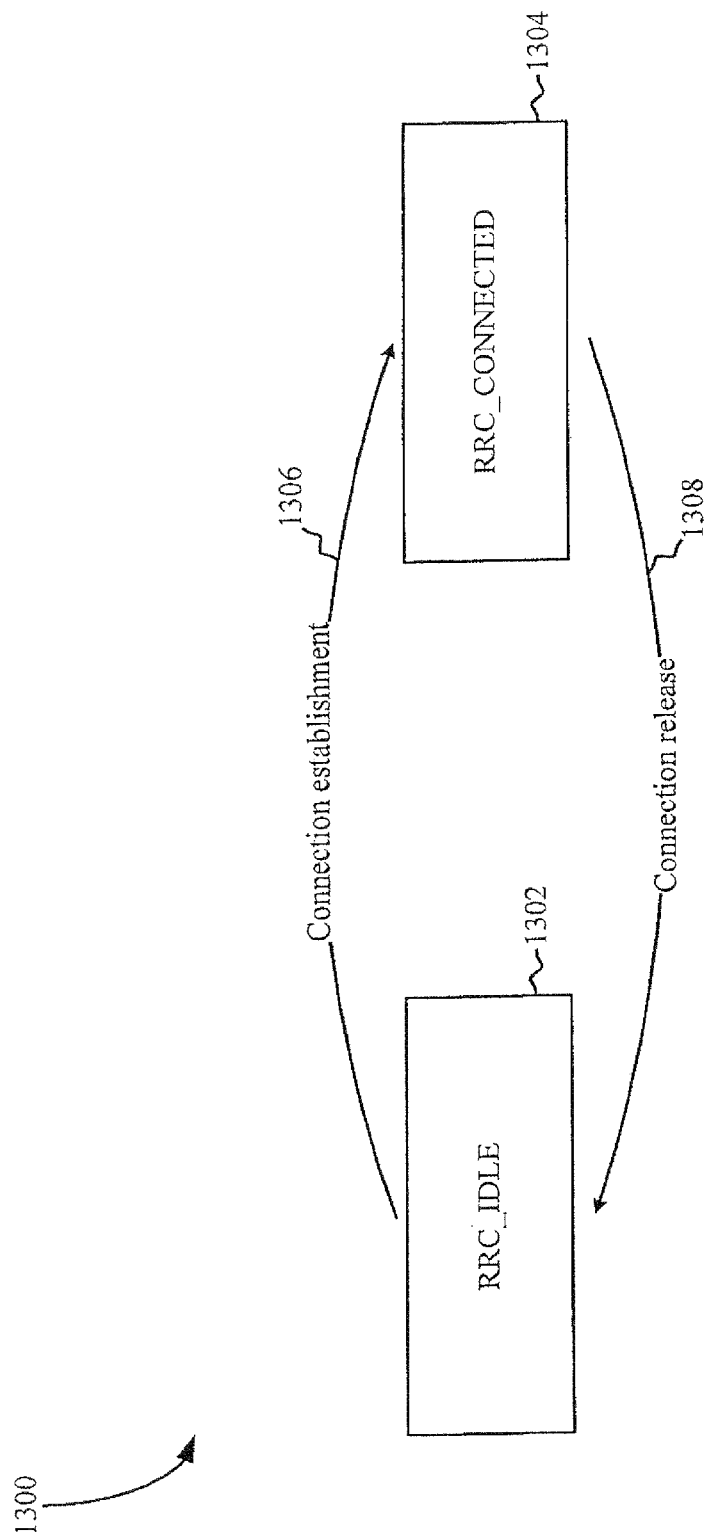
FIG. 13 is a graphical illustration of an exemplary Radio Resource Control (RRC) finite state machine in accordance with the invention.

As shown, the invention enabled eNB 900 provides radio service (e.g. voice, data, etc.) for one or more invention enabled UEs 1000 within E-UTRAN 1252 by establishing a Radio Resource Connection (RRC). The RRC of the UMTS LTE protocol stack (see FIG. 13) simplifies the control plane signaling between the UEs 1000 and eNB 900. The RRC comprises a simple state machine 1300 which performs connection establishment and release.

Two connection states of interest are specified in the RRC protocol layer: RRC_IDLE 1302 and RRC_CONNECTED 1304 of the UMTS LTE protocol stack. See for example, 3GPP Technical Specification TS 36.331 entitled "*E-UTRA Radio Resource Control (RRC)*", incorporated herein by reference in its entirety. The RRC connection is defined as a point-to-point bidirectional connection between RRC peer entities in the UE and eNodeB, respectively. In connected mode, there is only one RRC connection between a UE and eNodeB (a UE does not maintain multiple RRC connections). In idle mode, there is no RRC connection between the UE and eNodeB. In LTE, the paging channel provides different information for each connection state.

In the RRC_CONNECTED state 1304, the UE 1000 and eNodeB 900 actively handle radio resource allocations. Network controlled mobility is performed by explicit handover and cell change orders. The eNodeB must maintain/update UE position, at the cell area level. The UE actively acquires system information which is broadcast in the radio cell. Transmission of user and control data in uplink and downlink occurs during the RRC_CONNECTED state. The RRC protocol layer is responsible for broadcasting system level information, and for maintaining connection layer bi-directional control. The UE acquires system information which is broadcast in the radio cell and monitors paging channels to receive notification about modification of system information.

In the RRC_IDLE 1302 state, no radio resources are dedicated to the UE 1000 by the eNodeB 900. During the KRC_IDLE state, the UE performs a variety of functions necessary for radio link management, such as cell selection/reselection, monitoring of paging channels, and acquiring system information broadcast in the radio cell In this state, the MME in EPC 1254 maintains the UE position, known by the network at a "tracking area" level. A tracking area defines a group of cells where the UE is paged during incoming communication attempt.

At power-up, the UE is in RRC_IDLE 1302 During RRC_IDLE operation, there is no transmission of user and control data in either uplink or downlink. Two state changes for establishment 1306, and release 1308 of an RRC connection are used by the system. These state changes are under the control of eNodeB 900 and may be triggered by various events including notifications which are broadcast on the paging channel.

Exemplary LTE-A Configurable Paging Mode Operation—

Referring now back to FIG. 11, an exemplary deployment scenario useful for illustrating various embodiments of the present invention comprises an LTE network cell provided by an LTE-A eNodeB 900, in communication with a mixed population of UEs (e.g. invention enabled LTE-A UEs 1000, and legacy LTE UEs 1106). The eNodeB supports direct connections between LTE UE1 1106 and LTE-A UE3 1000. Connections from the eNodeB to LTE UE2 1106 and LTE-A UE4 1000 are supported through intermediate NodeR1 1104 and NodeR2 1104.

Figure 14:
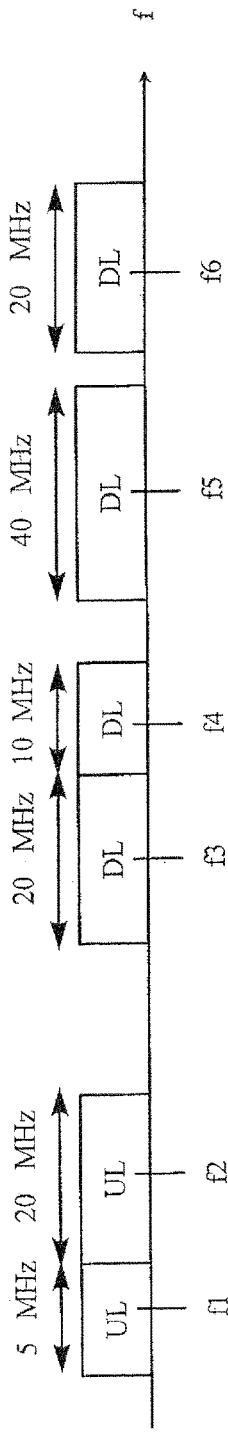
FIG. 14 is a graphical representation of one exemplary distribution of frequency band resources for use with the 3GPP LTE network infrastructure embodiment of FIG. 11.
Figure 15:
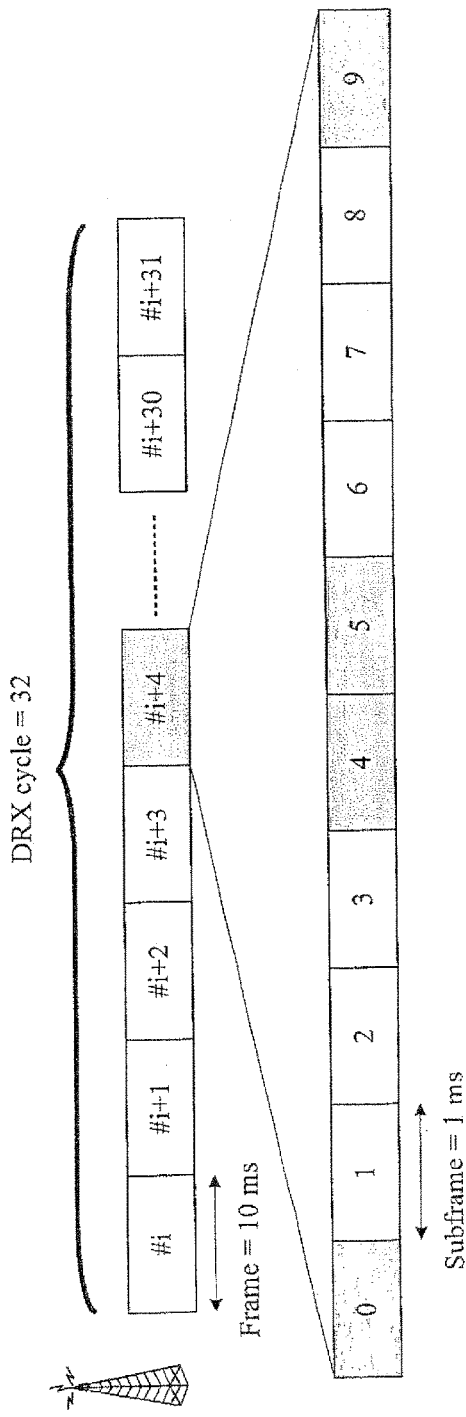
FIG. 15 is a graphical representation of one exemplary distribution of time slot resources for use with the 3GPP LTE network infrastructure embodiment of FIG. 11.

FIGS. 14, 15, and 16 illustrate sample characteristics for the exemplary LTE-A eNodeB 900 of FIG. 12. FIG. 14 is a graphical illustration of the frequency allocations for the uplink and downlink transmissions, denoted as f1 through f6. The LTE-A UE3 1000 and UE4 1000 support a maximum RF transmission/reception bandwidth of twenty (20) MHz, and are operated in the aggregated twenty-five (25) MHz uplink bands characterized by the carrier frequencies f1 and f2, and in the aggregated ninety (90) MHz downlink bands characterized by the carrier frequencies f3 to f6.

FIG. 15 is a graphical illustration of exemplary subframe allocations for paging messages. Depending on their individual settings, LTE-A UE3 1000 and UE4 1000 can monitor any number of the subframes zero (0), four (4), five (5), and nine (9) of corresponding paging frames. These paging configurations are further graphically depicted in FIG. 16.

The following Table 1 summarizes the aforementioned embodiment of the paging transmission modes configurations selected by the LTE-A eNodeB, and signaled to all UEs located in the cell:

TABLE 1

| Mode | Carrier Frequency | DRX cycle of paging subframes | Max BW (MHz) | Valid States |
|---|---|---|---|---|
| 1 | f3 | Frame #i + 4 Subframes #0, #4, #5, #9 | 20 MHz | RRC_IDLE, RRC_CONNECTED |
| 2 | f4 | Frame #i + 9 Subframes #0, #4, #5, #9 | 10 MHz | RRC_CONNECTED |
| 3 | f5 | Frame #i + 19 Subframes #0, #4, #5, #9 | 20 MHz | RRC_CONNECTED |
| 4 | f6 | Frame #i + 26 Subframes #0, #4, #5, #9 | 10 MHz | RRC_CONNECTED |

Illustrative Scenario 1:

Referring to the LTE-A enabled UE3 1000 of FIG. 11, UE3 1000 has an active connection with eNB 900 and is in the RRC_CONNECTED 1304 state. User and control data are transmitted in both the uplink and downlink directions. UE3 is operated in the downlink frequency band characterized by carrier frequency f5. UE3 monitors the PDCCH and PDSCH as configured by paging transmission mode three (3) 1602 (FIG. 16) to receive notifications about modifications to system information. Accordingly, the UE monitors frequency band f5 at radio frame #i+19 (subframes #0, #4, #5 and #9) within each DRX cycle of thirty-two (32) radio frames to determine whether its paging identifier is being transmitted via the Physical Downlink Control Channel (PDCCH). The eNodeB broadcasts paging messages (e.g. PDCCH and PDSCH) with a maximum bandwidth of twenty (20) MHz around the carrier frequency f5. If the UE detects its assigned paging identifier on the PDCCH, the UE decodes the associated Physical Downlink Shared Channel (PDSCH).

Illustrative Scenario 2:

In another example scenario, LTE-A UE4 1000 has no active connection with the eNodeB 900 and is in the RRC_IDLE 1302 state. UE4 is currently operated in the downlink frequency band of carrier frequency f3. UE4 monitors the PDCCH and PDSCH as configured by paging transmission mode one (1) 1604 (FIG. 16) so as to receive notification about incoming calls or modification of system information. The UE monitors frequency band f3 at radio frame #i+4 (subframes #0, #4, #5 and #9) within each DRX cycle of thirty-two (32) radio frames to determine whether its paging identifier is transmitted via the Physical Downlink Control Channel (PDCCH). The eNodeB broadcasts paging messages (e.g. PDCCH and PDSCH) with a maximum bandwidth of twenty (20) MHz around the carrier frequency f3. If the UE detects its assigned paging identifier on the PDCCH, the UE decodes the associated Physical Downlink Shared Channel (PDSCH).

Business Methods and Rules—

It will be recognized that the foregoing network apparatus and methodologies may be readily adapted to various business models. In one such model, a service provider/network operator may sell, lease, or freely provide (i.e., at no cost, as an incentive) an enhanced-capability femtocell. A femtocell augments the service provider's existing network of base stations by connecting to the service provider's network via a broadband interface (such as DSL, T1, ISDN, or DOCSIS cable modem). Femtocells are designed for self-contained deployment. The relative cost and simplicity of operation allows a non-technical audience (i.e., residential, enterprise, or other such users) to purchase and operate femtocells. The ad hoc nature of femtocell deployment is greatly improved with flexible spectrum usage and spectrum sharing, as well as intercell interference management provided by one or more aspects of the present invention. In one example, a femtocell may freely configure its paging mechanisms to minimally disrupt existing paging mechanisms by operating within unused or underutilized portions of spectrum.

In another business paradigm, appropriately enabled user equipment (e.g., UE 1000) may receive enhanced paging messages, and may efficiently monitor existing paging channels, thus increasing the overall perceived quality of experience. In one such embodiment, a dedicated subset of paging channels are allocated to enabled UEs. Thus while, legacy devices continue to broadly monitor all paging channels (in a comparatively inefficient manner), enabled devices 1000 only monitor the designated subset of paging channels. This approach is markedly more efficient, and drastically improves power consumption.

In an alternate embodiment, certain enhanced services (e.g. Multimedia Broadcast Multicast Service (MBMS)) may be continuously broadcast without an RRC connection. Typical broadcast services are not permanent, and once the broadcast finishes, the paging resources may be reclaimed by the network, without undue difficulty. Thus broadcast technologies may be improved by flexibly managing the notifications for such services via the paging mechanisms of the invention.

The aforementioned network apparatus and methodologies may also be readily adapted for operation in accordance with an underlying business rules algorithm or "engine". This business rules engine may comprise for example a software application (and/or firmware or even hardware aspects), and is implemented in one embodiment as a separate entity at the Core Network, or alternatively within an existing entity residing at the Core Network or other network management process (NMP). The rules engine is in effect a high-layer supervisory process which aids the network operator (or other interested party) in making operational decisions or resource allocations based on important criteria such as financial aspects, user experience enhancement, etc.

In one embodiment, the business rules engine is configured to take into account the revenue and/or profit implications associated with providing resources to one or more users. Accordingly, the exemplary business rules engine can modify the paging behaviors of the system to support a wider base of users (e.g. increasing overall paging resources) or alternatively, a wider range of services (e.g. decreasing overall paging resources).

For instance, in one example, evaluation of the requests from a population of users for resources (e.g., frequency spectrum) may include an analysis of the incremental cost, revenue, and/or profit associated with the various allocation options. In some cases, the network provider may determine that new service requests are uncommon, and thus paging is less important. In other cases, the network provider may determine that new users and services are frequently entering and exiting a cell, thus requiring an allocation of more paging resources. These "business rules" may be imposed e.g., at time of resource request, and then maintained for a period of time (or until an event triggering a re-evaluation occurs), or alternatively according to a periodic model.

Myriad other schemes for implementing dynamic allocation of resources will be recognized by those of ordinary skill given the present disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A user equipment (UE), comprising:
    a transceiver configured to establish a connected state with a cellular network; and
    a baseband processor connected to the transceiver configured to:
        receive timing data, wherein the timing data indicates a plurality of paging transmissions to be transmitted on at least one carrier of a plurality of aggregated carriers corresponding to the cellular network; and
        when in the connected state, monitor only a first carrier of the plurality of aggregated carriers for a first paging transmission of the plurality of paging transmissions based on the timing data, wherein the cellular network allocates resources for the plurality of paging transmission based at least in part on a ratio of enhanced devices to legacy devices on the cellular network.

2. The UE of claim 1, wherein the connected state is a RRC_connected state.

3. The UE of claim 2, wherein the cellular network transmits the timing data to the UE according to a first mode of paging transmission operations based on the UE and the cellular network being in the RRC_connected state.

4. The UE of claim 1, wherein the UE receives the timing data based on the UE monitoring a Physical Downlink Control Channel (PDCCH) during at least one predetermined time interval.

5. The UE of claim 1, wherein the plurality of paging transmission is transmitted to the UE on a Physical Downlink Shared Channel (PDSCH).

6. The UE of claim 1, wherein the plurality of paging transmissions each correspond to one of a network service or a network notification specifically addressed to the UE.

7. A baseband processor, configured to perform operations comprising:
    receiving timing data, wherein the timing data indicates a plurality of paging transmissions to be transmitted on at least one carrier of a plurality of aggregated carriers corresponding to a cellular network; and
    when in a connected state, monitoring only a first carrier of the plurality of aggregated carriers for a first paging transmission of the plurality of paging transmissions based on the timing data, wherein the cellular network allocates resources for the plurality of paging transmission based at least in part on a ratio of enhanced devices to legacy devices on the cellular network.

8. The baseband processor of claim 7, the operations further comprising:
    decoding the first paging transmission based on the timing data.

9. The baseband processor of claim 7, wherein the timing data is transmitted to the baseband processor on a Physical Downlink Control Channel (PDCCH) and the first paging transmission is transmitted to the baseband processor on a Physical Downlink Shared Channel (PDSCH).

10. The baseband processor of claim 9, wherein the PDCCH and the PDSCH are transmitted in a first subframe.

11. The baseband processor of claim 10, wherein the PDCCH occupies one of one, two or three orthogonal frequency division multiplexing (OFDM) symbols in a first slot of the first subframe.

12. The baseband processor of claim 7, wherein the connected state is a RRC_connected state.

13. A method, comprising:
    at a user equipment (UE):
        establishing a connected state with a cellular network;
        receive timing data, wherein the timing data indicates a plurality of paging transmissions to be transmitted on at least one carrier of a plurality of aggregated carriers corresponding to the cellular network; and
        when in the connected state, monitor only a first carrier of the plurality of carriers for a first paging transmission of the plurality of paging transmissions based on the timing data, wherein the cellular network allocates resources for the plurality of paging transmission based at least in part on a ratio of enhanced devices to legacy devices on the cellular network.

14. The method of claim 13, wherein the connected state is a RRC_connected state.

15. The method of claim 14, wherein the cellular network transmits the timing data to the UE according to a first mode of paging transmission operations based on the UE and the cellular network being in the RRC_connected state.

16. The method of claim 13, further comprising:
    decoding the first paging transmission based on the timing data.

17. The method of claim 13, wherein the timing data is transmitted to the baseband processor on a Physical Downlink Control Channel (PDCCH) and the first paging transmission is transmitted to the baseband processor on a Physical Downlink Shared Channel (PDSCH).

18. The method of claim 17, wherein the PDCCH and the PDSCH are transmitted in a first subframe.

19. The method of claim 18, wherein the PDCCH occupies one of one, two or three orthogonal frequency division multiplexing (OFDM) symbols in a first slot of the first subframe.

20. The method of claim 13, wherein the plurality of paging transmissions each correspond to one of a network service or a network notification.

* * * * *